(12) United States Patent
Fu et al.

(10) Patent No.: US 9,802,187 B2
(45) Date of Patent: Oct. 31, 2017

(54) NON-WOVEN ELECTRET FIBROUS WEBS AND METHODS OF MAKING SAME

(75) Inventors: Xiaoshuan Fu, Shanghai (CN); Rui Chen, Shanghai (CN); Qiang Xu, Shanghai (CN); Jean Le normand, Versailles (FR); Hendrik Both, Rijen (NL); Tien T. Wu, Woodbury, MN (US); Andrew R. Fox, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 876 days.

(21) Appl. No.: 14/125,329

(22) PCT Filed: Jun. 27, 2012

(86) PCT No.: PCT/US2012/044279
§ 371 (c)(1),
(2), (4) Date: Dec. 11, 2013

(87) PCT Pub. No.: WO2013/003391
PCT Pub. Date: Jan. 3, 2013

(65) Prior Publication Data
US 2014/0120322 A1 May 1, 2014

Related U.S. Application Data

(60) Provisional application No. 61/503,363, filed on Jun. 30, 2011.

(30) Foreign Application Priority Data
Dec. 26, 2011 (CN) .......................... 2011 1 0441145

(51) Int. Cl.
*B01J 35/06* (2006.01)
*D04H 1/4242* (2012.01)
(Continued)

(52) U.S. Cl.
CPC ........ *B01J 35/065* (2013.01); *B01D 39/1623* (2013.01); *B01D 39/2065* (2013.01);
(Continued)

(58) Field of Classification Search
CPC .... B01D 2239/0407; B01D 2239/0435; B01D 2239/064; B01D 39/1623; B01D 39/2065;
(Continued)

(56) References Cited

U.S. PATENT DOCUMENTS 1,975,504 A 10/1934 Formhals
3,516,941 A 6/1970 Matson
(Continued)

FOREIGN PATENT DOCUMENTS

CN 1272894 A 11/2000
CN 2650849 Y 10/2004
(Continued)

OTHER PUBLICATIONS

Davies, "The Separation of Airborne Dust and Particulates", Institution of Mechanical Engineers, 185-198 (1952).
(Continued)

*Primary Examiner* — Arti Singh-Pandey
(74) *Attorney, Agent, or Firm* — James A. Baker

(57) ABSTRACT

A non-woven electret fibrous web for electrostatic adsorption and odor elimination and the preparation process thereof. In certain exemplary embodiments, the non-woven electret fibrous web includes a multiplicity of electret fibers, at least one of a plurality of photo-catalytic fibers or a plurality of multi-component fibers; and optionally, at least one of a plurality of chemically-active particulates, a plurality of carbon-based fibers, or a plurality of mono-component thermoplastic fibers. In other exemplary embodiments, carding and cross-lapping or air-laying processes are disclosed for making nonwoven fibrous webs including
(Continued)

electret fibers and one or more of photocatalytic fibers, chemically-active particulates, multi-component fibers, mono-component thermoplastic fibers, or carbon-based fibers. In some exemplary embodiments, exemplary nonwoven electret fibrous webs of the disclosure exhibit superior gas permeation characteristics, high adsorption characteristics for airborne contaminants, as well as an odor elimination function.

20 Claims, 1 Drawing Sheet

(51) Int. Cl.

| | | |
|---|---|---|
| D04H 1/435 | (2012.01) | |
| B01J 35/02 | (2006.01) | |
| D01G 13/00 | (2006.01) | |
| D04H 1/413 | (2012.01) | |
| D04H 1/4374 | (2012.01) | |
| D04H 1/485 | (2012.01) | |
| D04H 1/732 | (2012.01) | |
| D06M 10/04 | (2006.01) | |
| B01D 39/16 | (2006.01) | |
| B01D 39/20 | (2006.01) | |
| D04H 1/4291 | (2012.01) | |
| D04H 1/4382 | (2012.01) | |
| D04H 1/4391 | (2012.01) | |

(52) U.S. Cl.
CPC .......... *B01J 35/023* (2013.01); *D01G 13/00* (2013.01); *D04H 1/413* (2013.01); *D04H 1/4242* (2013.01); *D04H 1/4291* (2013.01); *D04H 1/435* (2013.01); *D04H 1/4374* (2013.01); *D04H 1/4382* (2013.01); *D04H 1/4391* (2013.01); *D04H 1/485* (2013.01); *D04H 1/732* (2013.01); *D06M 10/04* (2013.01); *B01D 2239/0407* (2013.01); *B01D 2239/0435* (2013.01); *B01D 2239/064* (2013.01); *Y10T 428/24645* (2015.01); *Y10T 442/20* (2015.04); *Y10T 442/603* (2015.04); *Y10T 442/609* (2015.04); *Y10T 442/611* (2015.04); *Y10T 442/612* (2015.04); *Y10T 442/696* (2015.04)

(58) Field of Classification Search
CPC ....... B01J 32/023; B01J 35/065; D01G 13/00; D04H 1/413; D04H 1/4242; D04H 1/4291; D04H 1/435; D04H 1/4374; D04H 1/4382; D04H 1/4391; D04H 1/485; D04H 1/732; D06M 10/04; Y10T 428/24645; Y10T 442/20; Y10T 442/603; Y10T 442/609; Y10T 442/611; Y10T 442/612; Y10T 442/696
USPC .................. 28/102, 108, 165; 428/176, 219; 442/330, 335, 327, 338, 414, 59; 19/296, 19/66 R, 98
See application file for complete search history.

(56) References Cited

U.S. PATENT DOCUMENTS

| | | | |
|---|---|---|---|
| 3,802,817 A | 4/1974 | Matsuki | |
| 3,874,886 A | 4/1975 | Levecque | |
| 4,100,324 A | 7/1978 | Anderson | |
| 4,118,531 A | 10/1978 | Hauser | |
| 4,215,682 A | 8/1980 | Kubik | |
| 4,363,646 A | 12/1982 | Torobin | |
| 4,536,361 A | 8/1985 | Torobin | |
| 4,552,603 A | 11/1985 | Harris, Jr. | |
| 4,640,810 A | 2/1987 | Laursen | |
| 4,729,371 A | 3/1988 | Krueger | |
| 4,798,850 A | 1/1989 | Brown | |
| 4,818,464 A | 4/1989 | Lau | |
| 4,940,470 A | 7/1990 | Jaisinghani | |
| 5,114,787 A | 5/1992 | Chaplin | |
| 5,167,765 A | 12/1992 | Nielsen | |
| 5,227,107 A | 7/1993 | Dickenson | |
| 5,230,800 A | 7/1993 | Nelson | |
| 5,277,976 A | 1/1994 | Hogle | |
| 5,332,426 A | 7/1994 | Tang | |
| 5,401,446 A | 3/1995 | Tsai | |
| 5,486,410 A | 1/1996 | Groeger | |
| 5,496,507 A | 3/1996 | Angadjivand | |
| 5,554,722 A | 9/1996 | Eichenauer et al. | |
| 5,641,555 A | 6/1997 | Berrigan | |
| 5,643,507 A | 7/1997 | Berrigan | |
| 5,658,640 A | 8/1997 | Berrigan | |
| 5,658,641 A | 8/1997 | Berrigan | |
| 5,662,728 A | 9/1997 | Grorger | |
| 5,726,107 A * | 3/1998 | Dahringer | B01D 39/1623 15/209.1 |
| 5,792,242 A | 8/1998 | Haskett | |
| 5,817,584 A | 10/1998 | Singer et al. | |
| 5,908,598 A | 6/1999 | Rousseau | |
| 5,972,808 A | 10/1999 | Groeger | |
| 6,057,256 A | 5/2000 | Krueger | |
| 6,068,799 A | 5/2000 | Rousseau | |
| 6,114,017 A | 9/2000 | Fabbricante | |
| 6,119,691 A | 9/2000 | Angadjivand | |
| 6,183,670 B1 | 2/2001 | Torobin | |
| 6,213,122 B1 | 4/2001 | Rousseau | |
| 6,238,467 B1 | 5/2001 | Azarian | |
| 6,315,806 B1 | 11/2001 | Torobin | |
| 6,375,886 B1 | 4/2002 | Angadjivand | |
| 6,382,526 B1 | 5/2002 | Reneker | |
| 6,397,458 B1 | 6/2002 | Jones | |
| 6,406,657 B1 | 6/2002 | Eitzman | |
| 6,420,024 B1 | 7/2002 | Perez | |
| 6,454,986 B1 | 9/2002 | Eitzman | |
| 6,607,624 B2 | 8/2003 | Berrigan | |
| 6,645,618 B2 | 11/2003 | Hobbs | |
| 6,743,273 B2 | 6/2004 | Chung | |
| 6,743,464 B1 | 6/2004 | Insley | |
| 6,800,226 B1 | 10/2004 | Gerking | |
| 6,808,664 B2 | 10/2004 | Falk | |
| 6,824,718 B2 | 11/2004 | Eitzman | |
| 6,849,329 B2 | 2/2005 | Perez | |
| 6,861,025 B2 | 3/2005 | Erickson | |
| 7,491,354 B2 | 2/2009 | Andersen | |
| 7,691,168 B2 | 4/2010 | Fox | |
| 7,695,660 B2 | 4/2010 | Berrigan | |
| 7,765,698 B2 | 8/2010 | Sebastian | |
| 8,529,671 B2 | 9/2013 | Sebastian | |
| 8,613,795 B2 | 12/2013 | Li | |
| 2002/0146951 A1 | 10/2002 | Tai | |
| 2003/0039815 A1 | 2/2003 | Roth | |
| 2003/0207635 A1* | 11/2003 | Minemura | B01D 39/1623 442/327 |
| 2004/0016345 A1 | 1/2004 | Springett et al. | |
| 2008/0038976 A1 | 2/2008 | Berrigan | |
| 2009/0044702 A1 | 2/2009 | Adamek | |
| 2009/0199717 A1 | 8/2009 | Green | |
| 2009/0253323 A1 | 10/2009 | Muller | |
| 2010/0159770 A1 | 6/2010 | Walser et al. | |
| 2013/0108831 A1 | 5/2013 | Wu | |

FOREIGN PATENT DOCUMENTS

| | | |
|---|---|---|
| CN | 1593766 | 3/2005 |
| CN | 2935865 | 8/2007 |
| CN | 101428209 | 5/2009 |
| CN | 101990586 | 3/2011 |
| EP | 0881931 | 12/2007 |
| EP | 2075371 A1 | 7/2009 |
| JP | 1993-031310 A | 2/1993 |
| JP | 1999-319440 A | 11/1999 |
| JP | 2008-115519 A | 5/2008 |

(56) References Cited

FOREIGN PATENT DOCUMENTS

| | | |
|---|---|---|
| JP | 2009-119409 | 6/2009 |
| JP | 2009-240990 A | 10/2009 |
| JP | 2010-094666 A | 4/2010 |
| WO | WO 2008/085545 | 7/2008 |
| WO | WO 2011/028661 | 3/2011 |

OTHER PUBLICATIONS

International Search Report for PCT International Application PCT/US2012/044279 dated Jan. 29, 2013, 4 pages.

* cited by examiner

NON-WOVEN ELECTRET FIBROUS WEBS AND METHODS OF MAKING SAME

CROSS REFERENCE TO RELATED APPLICATIONS

This is a national stage filing under 35 U.S.C. 371 of PCT/US2012/044279, filed Jun. 27, 2012, which claims priority to U.S. Provisional Application No. 61/503,363, filed Jun. 30, 2011, and China Application No. 201110441145.1, filed Dec. 26, 2011, the disclosures of which are incorporated by reference in their entirety herein.

TECHNICAL FIELD

The present disclosure relates to non-woven electret fibrous webs including electret fibers and one or both of fibers having photo-catalytic activity and chemically-active particulates. More particularly, the disclosure describes non-woven electret fibrous webs useful as air filtering materials; for example, as air filters for heating, ventilation and cooling (HVAC) devices; cabin air filters for vehicles; respirators; and the like.

BACKGROUND

Air quality is crucial to life, and many companies are researching filtration materials for removing airborne contaminants, such as particulates and volatile organic compounds (VOC), with high efficiency and low air-flow resistance. The development of fibrous air filtration materials has recently focused on use of super fine fibers (e.g. nanofibers) or charged fibers to trap contaminants presented in an air stream. Use of nanofibers generally causes a relatively large pressure drop or air-flow resistance, which may have adverse effects in some air filtration applications. On the other hand, the adsorption ability of charged fibers is limited by the amount of such fibers in the fibrous web, and the effectiveness of charged fibers to adsorb airborne particulates is limited and diminishes over time as these materials reach their charge saturation limits. Furthermore, the use of such fibers alone generally cannot effectively eliminate odors due, for example, to the presence of VOC, such as formaldehyde and the like.

U.S. Pat. Nos. 5,230,800 and 5,792,242; and EP Patent No. 0881931B1 disclose filters incorporating electrostatically-charged fibers. Some recent patents describe use of photo-catalytic particulates (e.g. titanium dioxide) or photo-catalytic fibers to reduce odors. CN 101428209A discloses a titanium dioxide catalyst supported on a nanofiber prepared by electrospinning. CN 1593766A discloses an aluminum honeycomb photocatalyst filter prepared by spray coating.

SUMMARY

The inventors, through intensive research, have found that certain exemplary non-woven electret fibrous webs including, in a single layer, split film electrostatic (i.e. electret fibers) and at least one of photo-catalytic fibers or granulated activated carbon, have both the high contaminant adsorption characteristics and the low air flow resistance needed for long term use in air filtration to remove airborne contaminants (e.g., particulates and volatile organic compounds) and eliminate odors in air streams passed through the webs.

Thus, in one aspect, the disclosure describes non-woven electret fibrous webs useful for air filtration, including in a single layer, a plurality of electret fibers, and one or both of a plurality of photo-catalytic fibers and a plurality of chemically-active particulates, preferably granulated activated carbon particulates; and optionally one or more of a plurality of multi-component fibers, a plurality of mono-component thermoplastic fibers, and a plurality of carbon-based fibers. In certain exemplary embodiments, the non-woven electret fibrous web may have a corrugated or pleated structure to increase the overall surface area available for entrapment or adsorption of air contaminants. In some exemplary embodiments, the weight ratio of the electret fiber to the photo-catalytic fiber in the nonwoven fibrous web is 1:19 to 19:1.

In another aspect, the disclosure describes processes for preparing a non-woven electret fibrous web, comprising the steps of subjecting the electret fibers, the photo-catalytic fibers if present, the multi-component fibers if present, the mono-component thermoplastic fibers if present, the carbon-based fibers if present, and the chemically-active particulates if present, to the following treatments to form a non-woven electret fibrous web: opening, mixing, delivering to a feeding device, then carding or air laying, and bonding. In certain exemplary embodiments, the non-woven electret fibrous web is formed using a carding and cross-lapping method, or an air laying method, to form the non-woven electret fibrous web.

In further exemplary embodiments, the non-woven electret fibrous web may be processed to obtain a pleated web having a corrugated or pleated structure to increase the overall surface area available for entrapment or adsorption of airborne contaminants. In some such embodiments, the pleated web may be formed by air-laying the web components onto a patterned perforated collector having a three-dimensional corrugated pattern comprising, for example, a plurality of V-shaped lands and grooves, while passing an air stream through the perforations in the patterned perforated collector; the formed nonwoven fibrous web is subsequently subjected to a fiber bonding process. In another aspect, the pleated web may be formed by calendaring and mechanically pleating a bonded nonwoven fibrous web formed by carding and cross-lapping or air-laying. The pleated web includes electret fibers and one or both of a plurality of photo-catalytic fibers and a plurality of chemically-active particulates, preferably granulated activated carbon particulates; and optionally one or more of a plurality of multi-component fibers, a plurality of mono-component thermoplastic fibers, and a plurality of carbon-based fibers.

In a further aspect, non-woven electret fibrous webs useful as air filtering materials, for example air filters for HVAC devices, cabin air filters, respirators, and the like, are provided. In certain such embodiments, the air filtering materials have superior gas permeation characteristics (e.g. low air-flow resistance and pressure drop), high contaminant (e.g. particulate and VOC) adsorption efficiency, and good odor elimination effect.

DETAILED DESCRIPTION

Figure 1:
FIG. 1 is a schematic view illustrating an arranging manner of the fibers in a non-woven electret fibrous web according to exemplary embodiments of the disclosure.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

An "Electret" (e.g. an electret (e.g. split-film electrostatic) fiber, or a non-woven electret fibrous web comprising electret fibers) is a stable dielectric material with a quasi-permanently embedded static electric charge (which, due to the high resistance of the material, will not decay for an extended time period of up to hundreds of years) and/or a quasi-permanently oriented dipole polarization.

"Hydrocharged" used with respect to a collection of fibers means that the fibers have been placed in intimate contact with a polar fluid (e.g., water, an alcohol, a ketone, or mixture of polar fluids) and then dried under conditions sufficient so that the fibers become charged.

"Non-woven fibrous web" means an article or sheet having a structure of individual fibers or fibers, which are interlaid, but not in an identifiable manner as in a knitted fabric. Non-woven fabrics or webs have been formed from many processes such as for example, meltblowing processes, air-laying processes, and bonded carded web processes.

"(Co)polymeric" means a homopolymer or a copolymer.

"Cohesive non-woven electret fibrous web" means a fibrous web characterized by entanglement or bonding of the fibers sufficient to form a self-supporting web.

"Self-supporting" means a web having sufficient coherency and strength so as to be drapable and handleable without substantial tearing or rupture.

"Die" means a processing assembly for use in polymer melt processing and fiber extrusion processes, including but not limited to meltblowing and spun-bonding.

"Meltblowing" and "meltblown process" means a method for forming a non-woven electret fibrous web by extruding a molten fiber-forming material through a plurality of orifices in a die to form fibers while contacting the fibers with air or other attenuating fluid to attenuate the fibers into fibers, and thereafter collecting the attenuated fibers. An exemplary meltblowing process is taught in, for example, U.S. Pat. No. 6,607,624 (Berrigan et al.).

"Meltblown fibers" means fibers prepared by a meltblowing or meltblown process.

"Mono-component thermoplastic fibers" means fibers, typically meltblown fibers, containing a single (co)polymeric component, which exhibit a softening or melting temperature at a defined temperature above 25° C.

"Multi-component fibers" means fibers (e.g. bi-component fibers) containing two or more (co)polymeric components, such that a portion of the fiber exhibits a softening or melting temperature at a defined temperature above 25° C., while the remaining portion of the fiber remains in a solid, unsoftened and unmelted state at that defined temperature.

"Spun-bonding" and "spun bond process" mean a method for forming a non-woven electret fibrous web by extruding molten fiber-forming material as continuous or semi-continuous fibers from a plurality of fine capillaries of a spinneret, and thereafter collecting the attenuated fibers. An exemplary spun-bonding process is disclosed in, for example, U.S. Pat. No. 3,802,817 to Matsuki et al.

"Spun bond fibers" and "spun-bonded fibers" mean fibers made using spun-bonding or a spun bond process. Such fibers are generally continuous fibers and are entangled or point bonded sufficiently to form a cohesive non-woven electret fibrous web such that it is usually not possible to remove one complete spun bond fiber from a mass of such fibers. The fibers may also have shapes such as those described, for example, in U.S. Pat. No. 5,277,976 to Hogle et al., which describes fibers with unconventional shapes.

"Carding" and "carding process" mean a method of forming a non-woven electret fibrous web webs by processing staple fibers through a combing or carding unit, which separates or breaks apart and aligns the staple fibers in the machine direction to form a generally machine direction oriented fibrous non-woven web. An exemplary carding process is taught in, for example, U.S. Pat. No. 5,114,787 to Chaplin et al.

"Bonded carded web" refers to non-woven electret fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like.

"Autogenous bonding" means bonding between fibers at an elevated temperature as obtained in an oven or with a through-air bonder without application of solid contact pressure such as in point-bonding or calendering.

"Calendering" means a process of passing a non-woven electret fibrous web through rollers with application of pressure to obtain a compressed and bonded fibrous non-woven web. The rollers may optionally be heated.

"Densification" means a process whereby fibers which have been deposited either directly or indirectly onto a filter winding arbor or mandrel are compressed, either before or after the deposition, and made to form an area, generally or locally, of lower porosity, whether by design or as an artifact of some process of handling the forming or formed filter. Densification also includes the process of calendering webs.

"Void volume" means a percentage or fractional value for the unfilled space within a porous or fibrous body, such as a web or filter, which may be calculated by measuring the weight and volume of a web or filter, then comparing the weight to the theoretical weight of a solid mass of the same constituent material of that same volume.

"Porosity" means a measure of void volume in a material. Size, frequency, number, and/or interconnectivity of pores and voids contribute the porosity of a material.

"Randomly oriented" with particular reference to a population of fibers means that the fiber bodies are not substantially aligned in a single direction.

"Air-laying" is a process by which a non-woven electret fibrous web layer can be formed. In the air-laying process, bundles of small fibers having typical lengths ranging from about 3 to about 52 millimeters (mm) are separated and entrained in an air supply and then deposited onto a forming screen, usually with the assistance of a vacuum supply. The randomly oriented fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 to Laursen et al.

"Wet-laying" is a process by which a non-woven electret fibrous web layer can be formed. In the wet-laying process, bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g. hydroentangled), or may be bonded to one another using, for example, thermal point bonding, autogenous bonding, hot air bonding, ultrasonic bonding, needle punching, calendering, application of a spray adhesive, and the like. An exemplary wet-laying and bonding process is taught in, for example, U.S. Pat. No. 5,167,765 to Nielsen et al. Exemplary bonding processes are also disclosed in, for example, U.S. Patent Application Publication No. 2008/0038976 A1 to Berrigan et al.

To "co-form" or a "co-forming process" means a process in which at least one fiber layer is formed substantially simultaneously with or in-line with formation of at least one different fiber layer. Webs produced by a co-forming process are generally referred to as "co-formed webs."

"Particulate loading" or a "particle loading process" means a process in which particulates are added to a fiber stream or web while it is forming. Exemplary particulate loading processes are taught in, for example, U.S. Pat. No. 4,818,464 to Lau and U.S. Pat. No. 4,100,324 to Anderson et al.

"Particulate" and "particle" are used substantially interchangeably. Generally, a particulate or particle means a small distinct piece or individual part of a material in finely divided form. However, a particulate may also include a collection of individual particles associated or clustered together in finely divided form. Thus, individual particulates used in certain exemplary embodiments of the present disclosure may clump, physically intermesh, electro-statically associate, or otherwise associate to form particulates. In certain instances, particulates in the form of agglomerates of individual particulates may be intentionally formed such as those described in U.S. Pat. No. 5,332,426 (Tang et al.).

"Particulate-loaded media" or "particulate-loaded nonwoven electret fibrous web" means a non-woven web having an open-structured, entangled mass of discrete fibers, containing particulates enmeshed within or bonded to the fibers, the particulates being chemically active.

"Enmeshed" means that particulates are dispersed and physically held in the fibers of the web. Generally, there is point and line contact along the fibers and the particulates so that nearly the full surface area of the particulates is available for interaction with a fluid.

"Median fiber diameter" for a population of fibers is determined by producing one or more magnified images of the fiber population, such as by using a scanning electron microscope; measuring the fiber diameter of clearly visible fibers in the one or more magnified images resulting in a total number of fiber diameters, x; and calculating the arithmetic median (i.e. middle) fiber diameter of the x fiber diameters. Typically, x is greater than about 50, and desirably ranges from about 50 to about 2. However, in some cases, x may be selected to be as low as 30 or even 20. These lower values of x may be particularly useful for highly entangled fibers.

"Microfibers" means a population of fibers having a population median diameter of at least one micrometer ($\mu$m).

"Coarse microfibers" means a population of microfibers having a population median diameter of at least 10 $\mu$m.

"Fine microfibers" means a population of microfibers having a population median diameter of less than 10 $\mu$m.

"Ultrafine microfibers" means a population of microfibers having a population median diameter of 2 $\mu$m or less.

"Sub-micrometer fibers" means a population of fibers having a population median diameter of less than 1 $\mu$m.

"Continuous oriented microfibers" means essentially continuous fibers issuing from a die and traveling through a processing station in which the fibers are permanently drawn and at least portions of the polymer molecules within the fibers are permanently oriented into alignment with the longitudinal axis of the fibers ("oriented" as used with respect to a particular fiber means that at least portions of the polymer molecules of the fiber are aligned along the longitudinal axis of the fiber).

"Separately prepared microfibers" means a stream of microfibers produced from a microfiber-forming apparatus (e.g., a die) positioned such that the microfiber stream is initially spatially separate (e.g., over a distance of about 1 inch (25 mm) or more from, but will merge in flight and disperse into, a stream of larger size microfibers.

"Web basis weight" is calculated from the weight of a 10 cm×10 cm web sample, and is usually expressed in grams per square meter (gsm).

"Web thickness" is measured on a 10 cm×10 cm web sample using a thickness testing gauge having a tester foot with dimensions of 5 cm×12.5 cm at an applied pressure of 150 Pa.

"Bulk density" is the mass per unit volume of the bulk polymer or polymer blend that makes up the web, taken from the literature.

"Effective Fiber Diameter" or "EFD" is the apparent diameter of the fibers in a nonwoven electret fibrous web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., *The Separation of Airborne Dust and Particulates*, Institution of Mechanical Engineers, London Proceedings, 1B (1952).

"Molecularly same polymer" means polymers that have essentially the same repeating molecular unit, but which may differ in molecular weight, method of manufacture, commercial form, and the like.

"Single layer" means a single stratum formed between two major surfaces. A layer may exist internally within a single web, e.g., a single stratum formed with multiple strata in a single web having first and second major surfaces defining the thickness of the web. A layer may also exist in a composite article comprising multiple webs, e.g., a single stratum in a first web having first and second major surfaces defining the thickness of the web, when that web is overlaid or underlaid by a second web having first and second major surfaces defining the thickness of the second web, in which case each of the first and second webs forms at least one layer. In addition, layers may simultaneously exist within a single web and between that web and one or more other webs, each web forming a layer.

"Adjoining" with reference to a particular first layer means joined with or attached to another, second layer, in a position wherein the first and second layers are either next to (i.e., adjacent to) and directly contacting each other, or contiguous with each other but not in direct contact (i.e., there are one or more additional layers intervening between the first and second layers).

"Particulate density gradient," "sorbent density gradient," and "fiber population density gradient" mean that the amount of particulate, sorbent or fibrous material within a particular fiber population (e.g., the number, weight or volume of a given material per unit volume over a defined area of the web) need not be uniform throughout the non-woven electret fibrous web, and that it can vary to provide more material in certain areas of the web and less in other areas.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but is to be controlled by the limitations set forth in the claims and any equivalents thereof.

A. Non-Woven Electret Fibrous Webs

In one aspect, the disclosure describes a non-woven electret fibrous web useful for air filtration, including in a single layer, a plurality of electret fibers, and one or both of a plurality of photo-catalytic fibers and a plurality of chemically-active particulates, preferably granulated activated carbon particulates; and optionally one or more of a plurality of multi-component fibers, a plurality of mono-component thermoplastic fibers, and a plurality of carbon-based fibers. In certain exemplary embodiments, the non-woven electret fibrous web may have a corrugated or pleated structure to increase the overall surface area available for entrapment or adsorption of air contaminants.

FIG. 1 is a schematic view illustrating an arrangement of fibers in a non-woven electret fibrous web according to an exemplary embodiment of the disclosure. As shown in FIG. 1, the fibers 1 (e.g. the photo-catalytic fibers) and the fibers 2 (e.g. the electret fibers) are randomly arranged in a single layer of the non-woven electret fibrous web 3.

Figure 2:
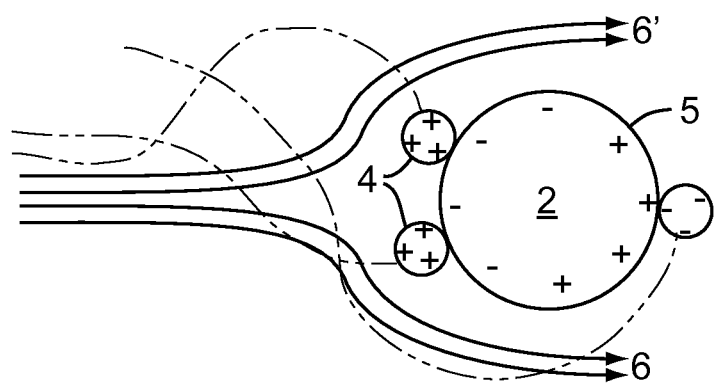
FIG. 2 is a schematic view wherein some of the particulate substance adhered to the surfaces of the fibers and the others are captured by the web-shaped structure composed of the fibers after the particulate substance entered the non-woven electret fibrous web according to exemplary embodiments of the disclosure.

FIG. 2 is a schematic magnified view of a portion of the non-woven electret fibrous web 3 of FIG. 1, showing that the web-shaped structure composed of the fibers capture at least a portion of airborne particulate substances in an air stream passed through the non-woven electret fibrous web 3, either by physical entrapment or by charge attraction to oppositely-charged electret fibers. As shown in FIG. 2, when the airborne particulate substance 4 enters the non-woven electret fibrous web 3, some of the particulate substance 4 adheres to the surfaces of the electrostatic fibers 2 due to electrostatic interaction resulting from the oppositely-charge electret fibers, and others are physically captured by the fibrous network formed by the photo-catalytic fibers intermingled with the electrostatic fibers 2, allowing a gas (e.g. air) stream (6,6') to pass through the web 3. The photocatalytic fibers also catalyze the light-induced oxidation of volatile organic compounds present in the air stream to form carbon dioxide gas and water vapor.

Optionally, the non-woven article includes randomly oriented discrete fibers that are filling fibers, that is, fibers that are not multi-component fibers, and which are preferably mono-component and/or natural fibers. In some presently preferred embodiments, at least some of the filling fibers may be bonded to at least a portion of the discrete fibers at a plurality of intersection points with the first region of the multi-component fibers.

In another exemplary embodiment illustrated by the exploded view of FIG. 1 shown in FIG. 2B, the non-woven electret fibrous web comprises a plurality of randomly oriented discrete fibers and optionally a plurality of particulates (which may be chemically active particulates), the randomly oriented discrete fibers comprising a first population of mono-component thermoplastic thermoplastic fibers having a first melting temperature, and a second population of mono-component thermoplastic fibers having a second melting temperature greater than the first melting temperature. At least a portion of the particulates are bonded to at least a portion of the first population of mono-component thermoplastic fibers, and at least a portion of the first population of mono-component thermoplastic fibers is bonded to at least a portion of the second population of mono-component thermoplastic fibers.

In some exemplary embodiments of non-woven electret fibrous webs including filling fibers, the particulates are preferably not substantially bonded to the filling fibers, and in certain exemplary embodiments, the filling fibers are not substantially bonded to each other.

Flexible and compact non-woven electret fibrous webs may be preferred for certain applications, for examples as furnace filters or gas filtration respirators. Such non-woven electret fibrous webs typically have a density greater than 75 $kg/m^3$ and typically greater than 100 $kg/m^3$ or even 120 100 $kg/m^3$. However, open, lofty non-woven electret fibrous webs suitable for use in certain fluid filtration applications generally have a maximum density of 60 $kg/m^3$. Certain non-woven electret fibrous webs according to the present disclosure may have Solidity less than 20%, more preferably less than 15%, even more preferable less than 10%.

In other exemplary embodiments of the disclosure, the non-woven electret fibrous web can have a Basis Weight of 40 to 250 grams per square meter (gsm). In one exemplary embodiment of the disclosure, the non-woven electret fibrous web can have a Basis Weight of 80 to 150 grams per square meter (gsm).

B. Discrete Fibrous Components

Non-woven electret fibrous webs of the present disclosure comprise one or more of the following discrete fiber components.

1. Electret Fiber Components

The non-woven electret fibrous webs of the present disclosure comprise a multiplicity of randomly oriented discrete fibers comprising electret fibers. Suitable electret fibers are described in U.S. Pat. Nos. 4,215,682; 5,641,555; 5,643,507; 5,658,640; 5,658,641; 6,420,024; 6,645,618; 6,849,329; and 7,691,168.

In exemplary embodiments of the disclosure, the electret fiber can be selected from a fiber prepared using a method for applying an electrostatic charge to uncharged fibers (i.e. an electrostatic applying technology), preferably (co)polymer fibers. Thus, suitable electret fibers may be produced by meltblowing fibers in an electric field, e.g. by melting a suitable dielectric material such as a polymer or wax that contains polar molecules, passing the molten material through a melt-blowing die to form discrete fibers, and then allowing the molten polymer to re-solidify while the discrete fibers are exposed to a powerful electrostatic field. Electret fibers may also be made by embedding excess charges into a highly insulating dielectric material such as a polymer or wax, e.g. by means of an electron beam, a corona discharge, injection from an electron, electric breakdown across a gap or a dielectric barrier, and the like.

Particularly suitable electret fibers are hydrocharged fibers. Hydrocharging of fibers may be carried out using a variety of techniques including impinging, soaking or condensing a polar fluid onto the fiber, followed by drying, so that the fiber becomes charged. Representative patents describing hydrocharging include U.S. Pat. Nos. 5,496,507; 5,908,598; 6,375,886 B1; 6,406,657 B1; 6,454,986 and 6,743,464 B1. Preferably water is employed as the polar hydrocharging liquid, and the media preferably is exposed to the polar hydrocharging liquid using jets of the liquid or a stream of liquid droplets provided by any suitable spray means.

Devices useful for hydraulically entangling fibers are generally useful for carrying out hydrocharging, although the operation is carried out at lower pressures in hydrocharging than generally used in hydroentangling. U.S. Pat. No. 5,496,507 describes an exemplary apparatus in which jets of water or a stream of water droplets are impinged upon the fibers in web form at a pressure sufficient to provide the subsequently-dried media with a filtration-enhancing electret charge.

The pressure necessary to achieve optimum results may vary depending on the type of sprayer used, the type of polymer from which the fiber is formed, the thickness and density of the web, and whether pretreatment such as corona charging was carried out before hydrocharging. Generally, pressures in the range of about 69 to about 3450 kPa are suitable. Preferably, the water used to provide the water droplets is relatively pure. Distilled or deionized water is preferable to tap water.

The electret fibers may be subjected to other charging techniques in addition to or alternatively to hydrocharging, including electrostatic charging (e.g., as described in U.S. Pat. Nos. 4,215,682, 5,401,446 and 6,119,691), tribocharging (e.g., as described in U.S. Pat. No. 4,798,850) or plasma fluorination (e.g., as described in U.S. Pat. No. 6,397,458 B1). Corona charging followed by hydrocharging and plasma fluorination followed by hydrocharging are particularly suitable charging techniques used in combination.

In some exemplary embodiments, the electret fibers can have a length of 10-100 mm and the cross section thereof is circular, triangular, square, rectangular, other polygonal shape, or the like, or other cross-sectional shapes (i.e. cross-shaped, X-shaped, and the like) In one exemplary embodiment of the disclosure, the electret fibers can have a length of 38-90 mm.

With regard to the electret fibers used in the present disclosure, for example, the electret fibers manufactured by 3M Company (Breda, The Netherlands) under the trade name of FILTRETE is currently preferred, more preferably having a rectangular cross section of 10 micrometers ($\mu m$)× 40 $\mu m$ and a length of 90 mm, due to the superior electrostatic maintaining rate which provide these fibers with excellent particulate adsorption characteristics.

2. Optional Photo-Catalytic Fiber Components

In some exemplary embodiments of the disclosure, the photo-catalytic fiber can be selected from a honey comb photo-catalytic fiber and a synthetic fiber treated by nano-grade photo-catalysis. One example of a photo-catalytic fiber is a titanium dioxide containing (co)polymeric fiber which is prepared by introducing 50 nm titanium dioxide into the fiber spinning process.

In certain exemplary embodiments, the photo-catalytic fiber can have a length of 10-100 mm and a fineness of 0.5-20 deniers (D). In other exemplary embodiments, the photo-catalytic fiber can have a length of 38-90 mm and a fineness of 1.5-6 deniers (D).

One specific example of a photo-catalytic fiber used in the present disclosure is the photo-catalytic fiber with a specification of 1.5 D×38 mm purchased from SHANGYU HONGQIANG COLOURED POLYESTER CO., LTD (People's Republic of China). After irradiating (preferably with an ultraviolet ray at about 253 nm) the photo-catalytic fiber, organic contaminants (i.e. VOC) can be decomposed into carbon dioxide and water by oxidation.

3. Optional Multi-Component Fiber Components

In some embodiments, the non-woven electret fibrous web comprises randomly oriented discrete fibers including multi-component fibers having at least a first region and a second region, wherein the first region has a melting temperature lower than the second region. A variety of different types and configurations of multi-component fibers exist. Suitable multi-component fibers are described in, for example, U.S. Pat. No. 7,695,660 (Berrigan et al.); U.S. Pat. No. 6,057,256 (Krueger et al.); and U.S. Pat. Nos. 5,486, 410, 5,662,728, and 5,972,808 (all Groeger et al.).

In certain exemplary embodiments, the multi-component fibers are bi-component fibers. One example of a suitable bi-component fiber is a sheath/core fiber, where the sheath that surrounds the core forms the first region and the core forms the second region of the fiber. The first region may be comprised of such materials as copolyester or polyethylene. The second region may be comprised of such materials as polypropylene or polyester. Suitable bi-component fibers are described in, for example, U.S. Pat. No. 4,552,603 (to Harris et al.).

During heating, the first region will melt, while the second region with a higher melting temperature remains intact. During melting, the first region tends to collect at junction points where fibers contact one another. Then, upon cooling, the material of the first region will resolidify to secure the web together. Therefore, it is a region of the multi-component fiber that secures the fibers together to form the web. There is generally not a need for a separate binder to form the non-woven electret fibrous web.

By using the process disclosed below, it is possible to use the melted first region of the multi-component fiber to secure particulates to the multi-component fiber, and therefore to the non-woven electret fibrous web. In general, the more multi-component fiber used in the electret fibrous web, the higher the possible loading of the particulates, as higher amounts of multi-component fibers may function to secure the particulates to the non-woven electret fibrous web.

Surprisingly, however, we have discovered that by maintaining the quantity of multi-component fibers so that they comprise greater than 0% and less than 10% wt. of the total weight of the non-woven electret fibrous web, more preferably greater than 0% and less than 10% wt. of the total weight of the randomly oriented discrete fibers used in the non-woven electret fibrous web, the particulates may be adequately secured to the non-woven electret fibrous web without occluding a substantial portion of the particulate surface with melted material of first region. This may be particularly important for applications in which chemically active particulates are used, for example, gas and liquid filtration applications.

In some presently preferred exemplary embodiments, the multi-component fibers are comprised in the fibrous web in an amount of at least 10%, 20%, 30%, 40%, 50% or even 60% or more by weight of the total weight of the non-woven electret fibrous web; and preferably no more than 100%, 90%, 80%, 70% or even 60% by weight of the total weight of the non-woven electret fibrous web.

Thus, in some exemplary presently-preferred embodiments, not more than 9%, 8%, 7%, 6%, 5%, 4%, or 3% wt. of the plurality of randomly oriented discrete fibers in the non-woven electret fibrous web comprise multi-component fibers.

Preferred multi-component fibers comprise synthetic polymers. Preferred synthetic polymers may be copolymers or even terpolymers. Preferred polymers and copolymer components may be selected from polyester, polyamide, polyolefin, cyclic polyolefin, polyolefinic thermoplastic elastomers, poly(meth)acrylate, polyvinyl halide, polyacrylonitrile, polyurethane, poly lactic acid, polyvinyl alcohol, polyphenylene sulfide, polysulfone, polyoxymethylene, fluid crystalline polymer, and combinations thereof.

Preferred multi-component fibers may include a core and a sheath structure. One suitable class of commercially-available core and sheath multi-component polymer is available under the trade name Celbond® (available from KoSa Co. of Wichita, Kans.), for example, Celbond® 254 fiber wherein the sheath has a melting temperature of 110° C. Other commercially available multi-component polymeric fibers are within the scope of the present disclosure.

Other multi-component fibers may consist of a layered structure where one layer has a first melting temperature and another layer has a second melting temperature lower than the first melting temperature. In such an arrangement, the layer with the second melting temperature will melt and resolidify to secure the web together.

Typically, the multi-component fibers are at least 0.25 inch (0.635 cm) long and have a denier of at least 1. Preferably, the multi-component fibers are at least 0.5 inches (1.27 cm) long and have a denier of at least 2. However, it is to be understood that the fibers can be as small as the shortest length of fiber that can be cut from a fiber, or as long as can be conveniently handled.

4. Optional Filling Fiber Components

In further exemplary embodiments, the non-woven electret fibrous web may additionally or alternatively comprise randomly oriented discrete fibers that are filling fibers, that is, fibers that are not multi-component fibers.

i. Optional Mono-Component Filling Fiber Components

Exemplary non-woven electret fibrous webs of the disclosure may comprise mono-component thermoplastic fibers as filling fibers. The mono-component thermoplastic fibers are also referred to as binder fibers. The addition of the mono-component thermoplastic fibers may facilitate the formation of a nonwoven electret fibrous web solidified by hot air which has a loose web surface, superior gas permeability and small differential pressure.

In certain exemplary embodiments, the mono-component thermoplastic fibers or mono-component thermoplastic filling fibers comprise a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, poly lactic acid, polyvinyl alcohol, polyphenylene sulfide, polysulfone, polyoxymethylene, fluid crystalline polymer, and combinations thereof. In certain exemplary embodiments, mono-component thermoplastic filler fibers that are non-thermoplastic or which do not exhibit a melting or softening point, may be blended together.

The mono-component thermoplastic fibers can preferably be selected, for example, from polyethylene terephthalate (PET) mono-component thermoplastic fibers, polyethylene (PE) mono-component thermoplastic fibers, or poly lactic acid (PLA) mono-component thermoplastic fibers. Currently preferred examples of the mono-component thermoplastic fibers include: polyethylene terephthalate (PET) mono-component thermoplastic fibers, for example, the mono-component thermoplastic fibers with a specification of 2 D×51 mm purchased from HUIWEISHI CO. LTD. or FAR EASTERN INDUSTRY CO. LTD.; polyethylene (PE) mono-component thermoplastic fibers, for example, the mono-component thermoplastic fibers with a specification of 3 D×51 mm purchased from GUANGZHOU YIAISI FIBER CO. LTD.; or poly lactic acid (PLA) fiber, for example, the mono-component thermoplastic fibers with a specification of 1.5 D×38 mm purchased from HAINING XINNENG FIBERS CO. LTD.

Surprisingly, however, we have discovered that by maintaining the quantity of mono-component thermoplastic thermoplastic fiber so that they comprise greater than 0% and less than 10% by weight of the total weight of randomly oriented discrete fibers used in the non-woven electret fibrous web, the particulates may be adequately secured to the non-woven electret fibrous web without occluding a substantial portion of the particulate surface with melted material of first region. This may be particularly important for applications in which chemically active particulates are used, for example, gas and liquid filtration applications.

In some exemplary embodiments, the non-woven electret fibrous web comprises a plurality of randomly oriented discrete fibers including a first population of mono-component thermoplastic thermoplastic fibers having a first melting temperature, and a second population of mono-component thermoplastic filling fibers having a second melting temperature greater than the first melting temperature. In some exemplary embodiments, the first population of mono-component thermoplastic thermoplastic fibers comprises greater than 0% and less than 10% wt. of the total weight of the non-woven electret fibrous web.

Thus, in some exemplary presently-preferred embodiments, not more than 9%, 8%, 7%, 6%, 5%, 4% or 3% wt. of the plurality of randomly oriented discrete fibers in the non-woven electret fibrous web comprise mono-component thermoplastic thermoplastic fibers.

In other presently preferred exemplary embodiments, the mono-component thermoplastic fibers comprises greater than 0% and less than 10% wt., more preferably from 1-10% wt., 2-9% wt., 3-8% wt. of the total weight of the non-woven electret fibrous web. In certain exemplary embodiments, the first population of mono-component thermoplastic fibers comprises greater than 0% and less than 10% wt., more preferably from 1-10% wt., 2-9% wt., 3-8% wt. of the plurality of randomly oriented discrete fibers.

Non-limiting examples of suitable filling fibers include single component synthetic fibers, semi-synthetic fibers, polymeric fibers, metal fibers, carbon fibers, ceramic fibers, and natural fibers. Synthetic and/or semi-synthetic polymeric fibers include those made of polyester (e.g., polyethylene terephthalate), nylon (e.g., hexamethylene adipamide, polycaprolactam), polypropylene, acrylic (formed from a polymer of acrylonitrile), rayon, cellulose acetate, polyvinylidene chloride-vinyl chloride copolymers, vinyl chloride-acrylonitrile copolymers, and the like.

In some exemplary embodiments of the disclosure in which mono-component thermoplastic fibers are included, the weight percentage of the electret fiber is preferably 10 to 60% by weight, the weight percentage of the mono-component thermoplastic fibers is preferably 5 to 30% by weight, and the weight percentage of the photo-catalytic fiber is preferably 30 to 80% by weight based on the weight of the non-woven electret fibrous web. In one particular exemplary embodiment, the weight percentage of the electret fiber is 20 to 55% by weight, the weight percentage of the mono-component thermoplastic fibers is 5 to 15% by weight, and the weight percentage of the photo-catalytic fiber is 40 to 75% by weight.

ii. Optional Carbon-Based Filling Fiber Components

Exemplary non-woven electret fibrous webs of the disclosure may comprise carbon-based fibers. Exemplary carbon-based fibers include, for example, bamboo charcoal fibers, coconut charcoal fibers, and the like. The addition of carbon-based fibers may facilitate odor reduction or elimination by adsorption.

In certain exemplary embodiments, the non-woven electret fibrous web may additionally comprise a carbon-based fiber selected from a bamboo charcoal fiber and a coconut charcoal fiber. One example of the bamboo charcoal fiber includes the bamboo charcoal fiber with a specification of 1.5 D×38 mm purchased from SHANGYU HONGQIANG COLOURED POLYESTER CO., LTD.

In such exemplary embodiments of the disclosure in which a carbon-based fiber is included, the weight percentage of the electret fiber is preferably 10 to 60% by weight, the weight percentage of the carbon-based fiber is preferably 30 to 85% by weight, and the weight percentage of the photo-catalytic fiber is preferably 5 to 20% by weight based on the weight of the non-woven electret fibrous web. In one exemplary embodiment of the disclosure, the weight percentage of the electret fiber is 20 to 55% by weight, the weight percentage of the carbon-based fiber is 40 to 75% by weight, and the weight percentage of the photo-catalytic fiber is 5 to 15% by weight.

iii. Optional Metal, Ceramic or Natural Filling Fiber Components

The size and amount of filling fibers, if included, used to form the non-woven electret fibrous web will depend on the desired properties (i.e., loftiness, openness, softness, drapability) of the non-woven electret fibrous web and the desired loading of the particulate. Generally, the larger the fiber diameter, the larger the fiber length, and the presence of a crimp in the fibers will result in a more open and lofty non-woven article. Generally, small and shorter fibers will result in a more compact non-woven article.

Non-limiting examples of suitable metal fibers include fibers made from any metal or metal alloy, for example, iron, titanium, tungsten, platinum, copper, nickel, cobalt, and the like.

Non-limiting examples of suitable carbon fibers include graphite fibers, activated carbon fibers, poly(acrylonitrile)-derived carbon fibers, and the like.

Non-limiting examples of suitable ceramic fibers include any metal oxide, metal carbide, or metal nitride, including but not limited to silicon oxide, aluminum oxide, zirconium oxide, silicon carbide, tungsten carbide, silicon nitride, and the like.

Non-limiting examples of suitable natural fibers include those of cotton, wool, jute, agave, sisal, coconut, soybean, hemp, and the like. The fiber component used may be virgin fibers or recycled waste fibers, for example, recycled fibers reclaimed from garment cuttings, carpet manufacturing, fiber manufacturing, textile processing, or the like.

C. Optional Particulate Components

As noted above, exemplary non-woven electret fibrous webs according to the present disclosure may optionally include a plurality of particulates. The particulates can be any discrete particulate which is a solid at room temperature. In certain exemplary embodiments, the plurality of particulates includes chemically-active particulates selected from adsorbent particulates, absorbent particulates, and combinations thereof.

In some particular exemplary embodiments, the chemically-active particulates are adsorbent or absorbent particles. For example, adsorbent particles could include granulated activated carbon, charcoal, sodium bicarbonate. For example, absorbent particles could include porous material, natural or synthetic foams such as melamine, rubber, urethane, polyester, polyethylene, silicones, and cellulose. The absorbent particle could also include superabsorbent particles such as sodium polyacrylates, carboxymethyl cellulose, or granulated polyvinyl alcohol.

The adsorbent or absorbent particles may have a size greater than 1 mm in diameter in one embodiment. In another embodiment, the adsorbent or absorbent particle may have a size less than 1 cm in diameter. In one embodiment, at least 50% wt. of the entire non-woven article is an absorbent foam. In another embodiment, at least 75% wt. of the entire non-woven article is an absorbent foam. In another embodiment, at least 90% wt. of the entire non-woven article is an absorbent foam.

In some exemplary embodiments presently preferred for gas or liquid filtration applications, the chemically-active particulates include chemically active particulates, which are capable of undergoing a chemical interaction with an external fluid phase. Exemplary chemical interactions include adsorption, absorption, chemical reaction, catalysis of a chemical reaction, dissolution, and the like. The chemically active particulates may, in some exemplary embodiments, be selected from activated carbon particulates (more preferably granulated activated carbon particulates), activated alumina particulates, silica gel particulates, desiccant particulates, anion exchange resin particulates, cation exchange resin particulates, molecular sieve particulates, diatomaceous earth particulates, anti-microbial compound particulates, and combinations thereof. In some particular exemplary embodiments, the chemically active particulates are distributed substantially throughout an entire thickness of a single layer of a non-woven electret fibrous web.

In one exemplary embodiment of a non-woven electret fibrous web particularly useful as a fluid filtration article, the particulates are sorbent particulates. A variety of sorbent particulates can be employed. Sorbent particulates include mineral particulates, synthetic particulates, natural sorbent particulates or a combination thereof. Desirably the sorbent particulates will be capable of absorbing or adsorbing gases, aerosols, or liquids expected to be present under the intended use conditions.

The sorbent particulates can be in any usable form including beads, flakes, granules or agglomerates. Preferred sorbent particulates include activated carbon; silica gel; activated alumina and other metal oxides; metal particulates (e.g., silver particulates) that can remove a component from a fluid by adsorption or chemical reaction; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; biocides; fungicides and virucides. Granulated activated carbon and activated alumina are presently particularly preferred sorbent particulates. Mixtures of sorbent particulates can also be employed, e.g., to absorb mixtures of gases, although in practice to deal with mixtures of gases it may be better to fabricate a multilayer sheet article employing separate sorbent particulates in the individual layers.

In one exemplary embodiment of a non-woven electret fibrous web particularly useful as a gas filtration article, the chemically active sorbent particulates are selected to be gas adsorbent or absorbent particulates. For example, gas adsorbent particulates may include activated carbon, charcoal, zeolites, molecular sieves, desiccants, an acid gas adsorbent, an arsenic reduction material, an iodinated resin, and the like. For example, absorbent particulates may also include naturally porous particulate materials such as diatomaceous earth, clays, or synthetic particulate foams such as melamine, rubber, urethane, polyester, polyethylene, silicones, and cellulose. The absorbent particulates may also include superabsorbent particulates such as sodium polyacrylates, carboxymethyl cellulose, or granulated polyvinyl alcohol.

In certain presently preferred embodiments of a non-woven electret fibrous web particularly useful as a liquid filtration article, the sorbent particulates comprise liquid an activated carbon, diatomaceous earth, an ion exchange resin (e.g. an anion exchange resin, a cation exchange resin, or combinations thereof), a molecular sieve, a metal ion exchange sorbent, an activated alumina, an antimicrobial compound, or combinations thereof. Certain presently preferred embodiments provide that the web has a sorbent particulate density in the range of about 0.20 to about 0.5 g/cc.

Various sizes and amounts of sorbent particulates may be used to create a non-woven electret fibrous web. In one exemplary embodiment, the sorbent particulates have a median size greater than 1 mm in diameter. In another exemplary embodiment, the sorbent particulates have a median size less than 1 cm in diameter. In one embodiment, a combination of particulate sizes can be used. In one exemplary embodiment, the sorbent particulates include a mixture of large particulates and small particulates.

The desired sorbent particulate size can vary a great deal and usually will be chosen based in part on the intended service conditions. As a general guide, sorbent particulates particularly useful for fluid filtration applications may vary in size from about 0.001 to about 3000 μm median diameter. Preferably the sorbent particulates are from about 0.01 to about 1500 μm median diameter, more preferably from about 0.02 to about 750 μm median diameter, and most preferably from about 0.05 to about 300 μm median diameter.

In certain exemplary embodiments, the sorbent particulates may comprise nanoparticulates having a population median diameter less than 1 μm. Porous nanoparticulates may have the advantage of providing high surface area for sorption of contaminants from a fluid medium (e.g., absorption and/or adsorption). In such exemplary embodiments using ultrafine or nanoparticulates, it is preferred that the particulates are adhesively bonded to the fibers using an adhesive, for example a hot melt adhesive, and/or the application of heat to one or both of thermoplastic particulates or thermoplastic fibers (i.e., thermal bonding).

Mixtures (e.g., bimodal mixtures) of sorbent particulates having different size ranges can also be employed, although in practice it may be better to fabricate a multilayer sheet article employing larger sorbent particulates in an upstream layer and smaller sorbent particulates in a downstream layer. At least 80 weight percent sorbent particulates, more preferably at least 84 weight percent and most preferably at least 90 weight percent sorbent particulates are enmeshed in the web. Expressed in terms of the web basis weight, the sorbent particulate loading level may for example be at least about 500 gsm for relatively fine (e.g. sub-micrometer-sized) sorbent particulates, and at least about 2,000 gsm for relatively coarse (e.g., micro-sized) sorbent particulates.

In some exemplary embodiments, the particulates are metal particulates. The metal particulates may be used to create a polishing non-woven electret fibrous web. The metal particulates may be in the form of short fiber or ribbon-like sections or may be in the form of grain-like particulates. The metal particulates can include any type of metal such as but not limited to silver (which has antibacterial/antimicrobial properties), copper (which has properties of an algaecide), or blends of one or more of chemically active metals.

In other exemplary embodiments, the particulates are solid biocides or antimicrobial agents. Examples of solid biocide and antimicrobial agents include halogen containing compounds such as sodium dichloroisocyanurate dihydrate, benzylkoniumchloride, halogenated dialkylhydantoins, and triclosan.

In further exemplary embodiments, the particulates are microcapsules. Microcapsules are described in U.S. Pat. No. 3,516,941 (Matson), and include examples of the microcapsules that can be used as the particulates. The microcapsules may be loaded with solid or liquid biocides or antimicrobial agents. One of the main qualities of a microcapsule is that by means of mechanical stress the particulates can be broken in order to release the material contained within them. Therefore, during use of the non-woven electret fibrous web, the microcapsules will be broken due to the pressure exerted on the non-woven electret fibrous web, which will release the material contained within the microcapsule.

In certain such exemplary embodiments, it may be advantageous to use at least one particulate that has a surface that can be made adhesive or "sticky" so as to bond together the particulates to form a mesh or support non-woven electret fibrous web for the fiber component. In this regard, useful particulates may comprise a polymer, for example, a thermoplastic polymer, which may be in the form of discontinuous fibers. Suitable polymers include polyolefins, particularly thermoplastic elastomers (TPE's) (e.g., VISTAMAXX™, available from Exxon-Mobil Chemical Company, Houston, Tex.). In further exemplary embodiments, particulates comprising a TPE, particularly as a surface layer or surface coating, may be preferred, as TPE's are generally somewhat tacky, which may assist bonding together of the particulates to form a three-dimensional network before addition of the fibers to form the non-woven electret fibrous web. In certain exemplary embodiments, particulates comprising a VISTAMAXX™ TPE may offer improved resistance to harsh chemical environments, particularly at low pH (e.g., pH no greater than about 3) and high pH (e.g., pH of at least about 9) and in organic solvents.

Any suitable size or shape of particulate material may be selected. Suitable particulates may have a variety of physical forms (e.g., solid particulates, porous particulates, hollow bubbles, agglomerates, discontinuous fibers, staple fibers, flakes, and the like); shapes (e.g., spherical, elliptical, polygonal, needle-like, and the like); shape uniformities (e.g., monodisperse, substantially uniform, non-uniform or irregular, and the like); composition (e.g. inorganic particulates, organic particulates, or combination thereof); and size (e.g., sub-micrometer-sized, micro-sized, and the like).

With particular reference to particulate size, in some exemplary embodiments, it may be desirable to control the size of a population of the particulates. In certain exemplary embodiments, particulates are physically entrained or trapped in the fiber non-woven electret fibrous web. In such embodiments, the population of particulates is preferably selected to have a median diameter of at least 50 µm, more preferably at least 75 µm, still more preferably at least 100 µm.

In other exemplary embodiments, it is preferred to use finer particulates that are adhesively bonded to the fibers using an adhesive, for example a hot melt adhesive, and/or the application of heat to one or both of thermoplastic particulates or thermoplastic fibers (i.e., thermal bonding). In such embodiments, it is generally preferred that the particulates have a median diameter of at least 25 µm, more preferably at least 30 µm, most preferably at least 40 µm. In some exemplary embodiments, the particulates have a median size less than 1 cm in diameter. In other embodiments, the particulates have a median size of less than 1 mm, more preferably less than 25 micrometers, even more preferably less than 10 micrometers.

However, in other exemplary embodiments in which both an adhesive and thermal bonding are used to adhere the particulates to the fibers, the particulates may comprise a population of sub-micrometer-sized particulates having a population median diameter of less than one micrometer (µm), more preferably less than about 0.9 µm, even more preferably less than about 0.5 µm, most preferably less than about 0.25 µm. Such sub-micrometer-sized particulates may be particularly useful in applications where high surface area and/or high absorbency and/or adsorbent capacity is desired. In further exemplary embodiments, the population of sub-micrometer-sized particulates has a population median diameter of at least 0.001 µm, more preferably at least about 0.01 µm, most preferably at least about 0.1 µm, most preferably at least about 0.2 µm.

In further exemplary embodiments, the particulates comprise a population of micro-sized particulates having a population median diameter of at most about 2,000 µm, more preferably at most about 1,000 µm, most preferably at most about 500 µm. In other exemplary embodiments, the particulates comprise a population of micro-sized particulates having a population median diameter of at most about 10 µm, more preferably at most about 5 µm, even more preferably at most about 2 µm (e.g., ultrafine microfibers). Multiple types of particulates may also be used within a single finished web. Using multiple types of particulates, it may be possible to generate continuous particulate webs even if one of the particulate types does not bond with other particulates of the same type. An example of this type of system would be one where two types are particulates are used, one that bonds the particulates together (e.g., a discontinuous polymeric fiber particulate) and another that acts as an active particulate for the desired purpose of the web (e.g., a sorbent particulate such as activated carbon). Such exemplary embodiments may be particularly useful for fluid filtration applications.

Depending, for example, on the density of the particulate, size of the particulate, and/or desired attributes of the final non-woven electret fibrous web article, a variety of different loadings of the particulates may be used relative to the total weight of the fibrous web. In one embodiment, the particulates comprise less than 90% wt. of the total non-woven article weight. In one embodiment, the particulates comprise at least 10% wt. of the total non-woven article weight.

In any of the foregoing embodiments, the particulates may be advantageously distributed throughout the entire thickness of the non-woven electret fibrous web. However, in some of the foregoing embodiments, the particulates are preferentially distributed substantially on a major surface of the non-woven electret fibrous web.

Furthermore, it is to be understood that any combination of one or more of the above described particulates may be used to form non-woven electret fibrous webs according to the present disclosure.

D. Optional Binder Components

In any of the foregoing exemplary embodiments, the non-woven electret fibrous web is preferably substantially free of any additional binder. However, in some of the foregoing embodiments, the non-woven electret fibrous web further comprises a binder coating covering at least a portion of the plurality of randomly oriented discrete fibers. In some exemplary embodiments, the binder may be a liquid or a solid powder. In certain presently preferred exemplary embodiments, the binder does not substantially occlude the surface of the particulates.

Although it is the first region of the multi-component fiber that secures the fibers, 120 and the particulate together, an optional binder material or coating may be included during or following the formation of the non-woven electret fibrous web. This optional binder coating may provide further strength to the non-woven article, may further secure the particulates to the fibers, and/or may provide additional stiffness for an abrasive or scouring article.

The optional binder coating may be applied by known processing means such as roll coating, spray coating, and immersion coating and combinations of these coating techniques. The binder coating may include additional particulate within the binder or additional particulates may be incorporated and secured to the binder.

The optional binder may be a resin. Suitable resins include phenolic resins, polyurethane resins, polyureas, styrene-butadiene rubbers, nitrile rubbers, epoxies, acrylics, and polyisoprene. The binder may be water soluble. Examples of water soluble binders include surfactants, polyethylene glycol, polyvinylpyrrolidones, poly lactic acid (PLA), polyvinylpyrrolidone/vinyl acetate copolymers, polyvinyl alcohols, carboxymethyl celluloses, hydroxypropyl cellulose starches, polyethylene oxides, polyacrylamides, polyacrylic acids, cellulose ether polymers, polyethyl oxazolines, esters of polyethylene oxide, esters of polyethylene oxide and polypropylene oxide copolymers, urethanes of polyethylene oxide, and urethanes of polyethylene oxide and polypropylene oxide copolymers.

E. Optional Additional Layers

The non-woven electret fibrous webs of the present disclosure may comprise additional layers. The one or more additional layers may be present over and/or under an outer surface of the nonwoven electret fibrous web.

Suitable additional layers include, but are not limited to, a color-containing layer (e.g., a print layer); any of the above-described support layers; one or more additional sub-micrometer fiber components having a distinct average fiber diameter and/or physical composition; one or more secondary fine sub-micrometer fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof.

Exemplary non-woven electret fibrous webs of the present disclosure may optionally comprise at least one additional layer of sub-micrometer fibers, fine fibers, microfibers or coarse fiber components, such as coarse microfibers. The at least one layer of fibers may be an underlayer, support layer or collector for the non-woven electret fibrous web, or may be an overlayer or cover layer. The at least one fiber layer may be co-formed with the non-woven electret fibrous web, or may be pre-formed as a web roll before forming the non-woven electret fibrous web, and unrolled to provide a collector or cover layer for the non-woven electret fibrous web, or may be post-formed after forming the non-woven electret fibrous web, and applied adjoining the non-woven electret fibrous web.

1. Optional Support Layer

The non-woven electret fibrous webs of the present disclosure may further comprise an optional support layer. In certain presently preferred embodiments, the optional support layer is porous. When present, the optional support layer may provide most of the strength of the composite non-woven fibrous article. In some embodiments, the above-described sub-micrometer fiber component tends to have very low strength, and can be damaged during normal handling. Attachment of the sub-micrometer fiber component to a support layer lends strength to the sub-micrometer fiber component, while retaining high porosity, and hence the desired absorbent properties of the sub-micrometer fiber component. A multi-layer non-woven electret fibrous web structure may also provide sufficient strength for further processing, which may include, but is not limited to, winding the web into roll form, removing the web from a roll, molding, pleating, folding, stapling, weaving, and the like.

A variety of support layers may be used in the present disclosure. Suitable support layers include, but are not limited to, a non-woven fabric, a woven fabric, a knitted fabric, a foam layer, a film, a paper layer, an adhesive-backed layer, a foil, a mesh, an elastic fabric (i.e., any of the above-described woven, knitted or non-woven fabrics having elastic properties), a web with an aperture, an adhesive-backed layer, or any combination thereof. In one exemplary embodiment, the porous support layer comprises a polymeric non-woven fabric. Suitable non-woven polymeric fabrics include, but are not limited to, a air-laided fabric, a meltblown fabric, a carded web of staple length fibers (i.e., fibers having a fiber length of less than about 100 mm), a needle-punched fabric, a split film web, a wet-laid hydroentangled web, an air-laid staple nonwoven electret fibrous web, or a combination thereof. In certain exemplary embodiments, the support layer comprises a web of bonded staple fibers. As described further below, bonding may be effected using, for example, thermal bonding, adhesive bonding, powdered binder bonding, hydroentangling, needlepunching, calendering, or a combination thereof.

The support layer may have a basis weight and thickness depending upon the particular end use of the composite non-woven fibrous article. In some embodiments of the present disclosure, it is desirable for the overall basis weight and/or thickness of the composite non-woven fibrous article to be kept at a minimum level. In other embodiments, an overall minimum basis weight and/or thickness may be required for a given application. Typically, the support layer has a basis weight of less than about 150 gsm. In some embodiments, the support layer has a basis weight of from about 5.0 gsm to about 100 gsm. In other embodiments, the support layer has a basis weight of from about 10 gsm to about 75 gsm.

As with the basis weight, the support layer may have a thickness, which varies depending upon the particular end use of the composite non-woven fibrous article. Typically, the support layer has a thickness of less than about 150 millimeters (mm), more preferably less than 100 mm, most preferably less than 50 mm. In certain embodiments, the support layer has a thickness of at least about 0.1 mm, more preferably at least 0.5 mm, most preferably at least 1.0 mm. In some embodiments, the support layer has a thickness of from about 1.0 mm to about 35 mm. In other embodiments, the support layer has a thickness of from about 2.0 mm to about 25 mm.

In certain exemplary embodiments, the support layer may comprise a microfiber component, for example, a population of microfibers, as described further below.

2. Optional Cover Layer

In some exemplary embodiments, non-woven electret fibrous webs of the present disclosure may further comprise an optional cover layer adjoining the non-woven electret fibrous web. In certain exemplary embodiments, the optional cover layer is porous. In some exemplary embodiments, the optional cover layer comprises sub-micrometer fibers. In certain presently preferred embodiments, the non-woven electret fibrous web comprises both a collector and a cover layer.

a. Microfibers

In some exemplary embodiments, a preferred microfiber or coarse fiber component comprises a population of microfibers having a population median fiber diameter of at least 1 μm. In other exemplary embodiments, a preferred coarse fiber component comprises a population of microfibers (more preferably polymeric microfibers) having a population median fiber diameter of at least 10 μm. In certain other exemplary embodiments, the microfiber component comprises a fiber population having a population median fiber diameter ranging from about 2 μm to about 100 μm. In further exemplary embodiments, the microfiber component comprises a fiber population having a median fiber diameter ranging from about 5 μm to about 50 μm.

In some exemplary embodiments, the microfiber component may comprise one or more polymeric materials. Generally, any fiber-forming polymeric material may be used in preparing the microfiber, though usually and preferably the fiber-forming material is semi-crystalline. The polymers commonly used in fiber formation, such as polyethylene, polypropylene, polyethylene terephthalate, nylon, and urethanes, are especially useful. Webs have also been prepared from amorphous polymers such as polystyrene. The specific polymers listed here are examples only, and a wide variety of other polymeric or fiber-forming materials are useful.

Suitable polymeric materials include, but are not limited to, polyolefins such as polybutylene, polypropylene and polyethylene; polyesters such as polyethylene terephthalate and polybutylene terephthalate; polyamide (Nylon-6 and Nylon-6,6); polyurethanes; polybutene; poly lactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

A variety of synthetic fiber-forming polymeric materials may be employed, including thermoplastics and especially extensible thermoplastics such as linear low density polyethylenes (e.g., those available under the trade designation DOWLEX™ from Dow Chemical Company, Midland, Mich.), thermoplastic polyolefinic elastomers (TPE's), for example, those available under the trade designations ENGAGE™ (from Dow Chemical Company, Midland, Mich.), and VISTAMAXX™ from Exxon-Mobil Chemical Company, Houston, Tex.), ethylene alpha-olefin copolymers (e.g., the ethylene butene, ethylene hexene or ethylene octene copolymers available under the trade designations EXACT™ from Exxon-Mobil Chemical Company, Houston, Tex.; and ENGAGE™ from Dow Chemical Company, Midland, Mich.), ethylene vinyl acetate polymers (e.g., those available under the trade designations ELVAX™ from E. I. DuPont de Nemours & Co., Wilmington, Del.), polybutylene elastomers (e.g., those available under the trade designations CRASTIN™ from E. I. DuPont de Nemours & Co., Wilmington, Del.; and POLYBUTENE-1™ from Basell Polyolefins, Wilmington, Del.), elastomeric styrenic block copolymers (e.g., those available under the trade designations KRATON™ from Kraton Polymers, Houston, Tex.; and SOLPRENE™ from Dynasol Elastomers, Houston, Tex.) and polyether block copolyamide elastomeric materials (e.g., those available under the trade designation PEBAX™ from Arkema, Colombes, France). Thermoplastic Polyolefinic Elastomers (TPE's) are especially preferred.

A variety of natural fiber-forming materials may also be made into non-woven microfibers according to exemplary embodiments of the present disclosure. Preferred natural materials may include bitumen or pitch (e.g., for making carbon fibers). The fiber-forming material can be in molten form or carried in a suitable solvent. Reactive monomers can also be employed, and reacted with one another as they pass to or through the die. The non-woven webs may contain a mixture of fibers in a single layer (made for example, using two closely spaced die cavities sharing a common die tip), a plurality of layers (made for example, using a plurality of die cavities arranged in a stack), or one or more layers of multi-component fibers (such as those described in U.S. Pat. No. 6,057,256 (Krueger et al.).

Fibers also may be formed from blends of materials, including materials into which certain additives have been blended, such as pigments or dyes. Bicomponent microfibers, such as core-sheath or side-by-side bi-component fibers, may be prepared ("bi-component" herein includes fibers with two or more components, each component occupying a part of the cross-sectional area of the fiber and extending over a substantial length of the fiber), as may be bi-component sub-micrometer fibers. However, exemplary embodiments of the disclosure may be particularly useful and advantageous with mono-component (in which the fibers have essentially the same composition across their cross-section, but "mono-component" includes blends or additive-containing materials, in which a continuous phase of substantially uniform composition extends across the cross-section and over the length of the fiber). Among other benefits, the ability to use single-component fibers reduces complexity of manufacturing and places fewer limitations on use of the web.

In addition to the fiber-forming materials mentioned above, various additives may be added to the fiber melt and extruded to incorporate the additive into the fiber. Typically, the amount of additives is less than about 25 weight percent, desirably, up to about 5.0 weight percent, based on a total weight of the fiber. Suitable additives include, but are not limited to, particulates, fillers, stabilizers, plasticizers, tackifiers, flow control agents, cure rate retarders, adhesion promoters (for example, silanes and titanates), adjuvants, impact modifiers, expandable microspheres, thermally conductive particulates, electrically conductive particulates, silica, glass, clay, talc, pigments, colorants, glass beads or bubbles, antioxidants, optical brighteners, antimicrobial agents, surfactants, fire retardants, and fluorochemicals.

One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, fluid barrier or adhesive tack related properties.

i. Formation of Microfibers

A number of processes may be used to produce and deposit a population of microfibers, including, but not limited to, melt blowing, melt spinning, fiber extrusion, plexifilament formation, air-laying, wet spinning, dry spinning, or a combination thereof. Suitable processes for forming microfibers are described in U.S. Pat. No. 6,315,806 (Torobin), U.S. Pat. No. 6,114,017 (Fabbricante et al.), U.S. Pat. No. 6,382,526 B1 (Reneker et al.), and U.S. Pat. No. 6,861,025 B2 (Erickson et al.). Alternatively, a population of microfibers may be formed or converted to staple fibers and combined with a population of sub-micrometer fibers using, for example, a process as described in U.S. Pat. No. 4,118,531 (Hauser). In certain exemplary embodiments, the population of microfibers comprises a web of bonded microfibers, wherein bonding is achieved using thermal bonding, adhesive bonding, powdered binder, hydroentangling, needlepunching, calendering, or a combination thereof, as described below.

b. Spun-Bonded and Carded Fibers

In one exemplary embodiment of the present disclosure, the support layer comprises a spun-bonded fabric comprising polypropylene fibers. In a further exemplary embodiment of the present disclosure, the support layer comprises a carded web of staple length fibers, wherein the staple length fibers comprise: (i) low-melting temperature or binder fibers; and (ii) high-melting temperature or structural fibers. Typically, the binder fibers have a melting temperature of at least 10° C. less than a melting temperature of the structural fibers, although the difference between the melting temperature of the binder fibers and structural fibers may be greater than 10° C. Suitable binder fibers include, but are not limited to, any of the above-mentioned polymeric fibers. Suitable structural fibers include, but are not limited to, any of the above-mentioned polymeric fibers, as well as inorganic fibers such as ceramic fibers, glass fibers, and metal fibers; and organic fibers such as cellulosic fibers.

In certain presently preferred embodiments, the support layer comprises a carded web of staple length fibers, wherein the staple length fibers comprise a blend of PET mono-component, and PET/coPET bi-component staple fibers. In one exemplary presently preferred embodiment, the support layer comprises a carded web of staple length fibers, wherein the staple length fibers comprise: (i) about 20 weight percent bi-component binder fibers (e.g. INVISTA™ T254 fibers, available from Invista, Inc., Wichita, Kans.), 12 d×1.5"; and (ii) about 80 weight percent structural fibers (e.g. INVISTA™ T293 PET fibers), 32 d×3".

As described above, the support layer may comprise one or more layers in combination with one another. In one exemplary embodiment, the support layer comprises a first layer, such as a non-woven fabric or a film, and an adhesive layer on the first layer opposite the sub-micrometer fiber component. In this embodiment, the adhesive layer may cover a portion of or the entire outer surface of the first layer. The adhesive may comprise any known adhesive including pressure-sensitive adhesives, heat activatable adhesives, etc. When the adhesive layer comprises a pressure-sensitive adhesive, the composite non-woven fibrous article may further comprise a release liner to provide temporary protection of the pressure-sensitive adhesive.

c. Sub-Micrometer Fibers

Exemplary non-woven electret fibrous webs of the present disclosure may optionally comprise a population of sub-micrometer fibers. In some presently preferred embodiments, the population of sub-micrometer fibers comprises a layer adjoining the non-woven electret fibrous web. The at least one layer comprising a sub-micrometer fiber component may be an underlayer (e.g. a support layer or collector for the non-woven electret fibrous web), but more preferably is used as an overlayer or cover layer. The population of sub-micrometer fibers may be co-formed with the non-woven electret fibrous web, or may be pre-formed as a web roll before forming the non-woven electret fibrous web and unrolled to provide a collector or cover layer for the non-woven electret fibrous web, or alternatively or additionally may be post-formed after forming the non-woven electret fibrous web, and applied adjoining, preferably overlaying, the non-woven electret fibrous web.

In certain exemplary embodiments, the fine fiber component comprises a population of fine microfibers having a population median diameter less than 10 µm. In other exemplary embodiments, the fine fiber component comprises a population of ultrafine microfibers having a population median diameter less than about 2 µm. In certain presently preferred embodiments, the fine fiber component comprises a population of sub-micrometer fibers having a population median diameter less than 1 µm.

In some exemplary embodiments, the sub-micrometer fiber component comprises a fiber population having a population median fiber diameter ranging from about 0.2 µm to about 0.9 µm. In other exemplary embodiments, the sub-micrometer fiber component comprises a fiber population having a population median fiber diameter ranging from about 0.5 µm to about 0.7 µm.

In some exemplary embodiments, the sub-micrometer fiber component may comprise one or more polymeric materials. Suitable polymeric materials include, but are not limited to, polyolefins such as polypropylene and polyethylene; polyesters such as polyethylene terephthalate and polybutylene terephthalate; polyamide (Nylon-6 and Nylon-6,6); polyurethanes; polybutene; poly lactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

The sub-micrometer fiber component may comprise mono-component comprising any one of the above-mentioned polymers or copolymers. In this exemplary embodiment, the mono-component may contain additives as described below, but comprise a single fiber-forming material selected from the above-described polymeric materials. Further, in this exemplary embodiment, the mono-component typically comprise at least 75 weight percent of any one of the above-described polymeric materials with up to 25 weight percent of one or more additives. Desirably, the mono-component comprise at least 80 weight percent, more desirably at least 85 weight percent, at least 90 weight percent, at least 95 weight percent, and as much as 100 weight percent of any one of the above-described polymeric materials, wherein all weights are based on a total weight of the fiber.

The sub-micrometer fiber component may also comprise multi-component fibers formed from (1) two or more of the above-described polymeric materials and (2) one or more additives as described below. Suitable multi-component fiber configurations include, but are not limited to, a sheath-core configuration, a side-by-side, a layered or a segmented pie/wedge configuration (for example, U.S. Pat. No. 4,729,371 describes layered bi-component meltblown fibers, also referred to as striped fibers; and PCT International Publication No. WO 2008/085545 describes segmented pie/wedge fibers and layered fibers in FIGS. 1a-1e), and an "islands-in-the-sea" configuration (for example, fibers produced by Kuraray Company, Ltd., Okayama, Japan).

For sub-micrometer fiber components formed from multi-component fibers, desirably the multi-component fiber comprises (1) from about 75 to about 99 weight percent of two or more of the above-described polymers and (2) from about 25 to about 1 weight percent of one or more additional fiber-forming materials based on the total weight of the fiber.

The methods of making non-woven electret fibrous webs of the present disclosure may be used to form a sub-micrometer fiber component containing fibers formed from any of the above-mentioned polymeric materials. Typically, the sub-micrometer fiber forming method step involves melt extruding a thermoformable material at a melt extrusion temperature ranging from about 130° C. to about 350° C. A die assembly and/or coaxial nozzle assembly (see, for example, the Torobin process referenced above) comprises a population of spinnerets and/or coaxial nozzles through which molten thermoformable material is extruded. In one exemplary embodiment, the coaxial nozzle assembly comprises a population of coaxial nozzles formed into an array so as to extrude multiple streams of fibers onto a support layer or substrate. See, for example, U.S. Pat. No. 4,536,361 (FIG. 2) and U.S. Pat. No. 6,183,670 (FIGS. 1-2).

In some exemplary embodiments, a non-woven electret fibrous web layer may be formed of sub-micrometer fibers commingled with coarser microfibers providing a support structure for the sub-micrometer non-woven fibers. The support structure may provide the resiliency and strength to hold the fine sub-micrometer fibers in the preferred low Solidity form. The support structure could be made from a number of different components, either singly or in concert. Examples of supporting components include, for example, microfibers, discontinuous oriented fibers, natural fibers, foamed porous cellular materials, and continuous or discontinuous non oriented fibers.

In one exemplary embodiment, a microfiber stream is formed and a sub-micrometer fiber stream is separately formed and added to the microfiber stream to form the non-woven electret fibrous web. In another exemplary embodiment, a sub-micrometer fiber stream is formed and a microfiber stream is separately formed and added to the sub-micrometer fiber stream to form the non-woven electret fibrous web. In these exemplary embodiments, either one or both of the sub-micrometer fiber stream and the microfiber stream is oriented. In an additional embodiment, an oriented sub-micrometer fiber stream is formed and discontinuous microfibers are added to the sub-micrometer fiber stream, e.g. using a process as described in U.S. Pat. No. 4,118,531 (Hauser).

In some exemplary embodiments, the method of making a non-woven electret fibrous web comprises combining the sub-micrometer fiber population and the microfiber population into a non-woven electret fibrous web by mixing fiber streams, hydroentangling, wet forming, plexifilament formation, or a combination thereof. In combining the sub-micrometer fiber population with the microfiber population, multiple streams of one or both types of fibers may be used, and the streams may be combined in any order. In this manner, non-woven composite fibrous webs may be formed exhibiting various desired concentration gradients and/or layered structures.

For example, in certain exemplary embodiments, the population of sub-micrometer fibers may be combined with a population of microfibers to form an inhomogeneous mixture of fibers. In other exemplary embodiments, the population of sub-micrometer fibers may be formed as an overlayer on an underlayer comprising the non-woven electret fibrous web. In certain other exemplary embodiments, the non-woven electret fibrous web may be formed as an overlayer on an underlayer (e.g. a support layer or collector) comprising the population of sub-micrometer fibers.

ii. Formation of Sub-Micrometer Fibers

A number of processes may be used to produce and deposit a population of sub-micrometer fibers, including, but not limited to melt blowing, melt spinning, electrospinning, gas jet fibrillation, or combination thereof. Suitable processes include, but are not limited to, processes disclosed in U.S. Pat. No. 3,874,886 (Levecque et al.), U.S. Pat. No. 4,363,646 (Torobin), U.S. Pat. No. 4,536,361 (Torobin), U.S. Pat. No. 6,183,670 (Torobin), U.S. Pat. No. 5,227,107 (Dickenson et al.), U.S. Pat. No. 6,114,017 (Fabbricante et al.), U.S. Pat. No. 6,382,526 B1 (Reneker et al.), U.S. Pat. No. 6,743,273 (Chung et al.), U.S. Pat. No. 6,800,226 (Gerking), and U.S. Pat. No. 6,861,025 B2 (Erickson et al.). One particularly suitable process for forming sub-micrometer fibers is described in U.S. Provisional Patent Application No. 61/238,761, titled "APPARATUS, SYSTEM, AND METHOD FOR FORMING NANOFIBERS AND NANONONWOVEN ELECTRET FIBROUS WEBS" (Moore et al.). A presently-preferred process for forming sub-micrometer fibers is an electrospinning process, for example, the processes described in U.S. Pat. No. 1,975,504 (Formhals).

F. Methods and Apparatus for Forming Non-Woven Electret Fibrous Webs

Exemplary embodiments of the disclosure provide a process for preparing the non-woven electret fibrous web as described above, which generally comprises the steps of subjecting the electret fibers, the photo-catalytic fibers (if present), the multi-component fibers (if present), the mono-component thermoplastic fibers (if present), the carbon-based fibers (if present), and the plurality of particulates (if present) to the following process steps to form a non-woven electret fibrous web: opening, mixing, delivering to a feeding device, then carding and cross-lapping or then air laying, and bonding.

Thus, in one exemplary embodiment of the disclosure, the process can comprise the steps of: delivering the desired fibers into a coarse opening apparatus to coarsely open the fibers; then delivering the fibers to a mixing apparatus to mechanically mix the fibers; then subjecting the fibers to a fine opening treatment; then introducing the fibers into a feeding device for feeding the fibers uniformly; then delivering the fibers to a carding machine for forming a substantially uniform non-woven electret fibrous web; then obtaining a nonwoven electret fibrous web by cross-lapping; and finally forming the non-woven electret fibrous web by subjecting the nonwoven electret fibrous web to needle punching process.

In another exemplary embodiment of the disclosure, the process can comprise the steps of: delivering the desired fibers into a coarse opening apparatus to coarsely open the fibers; then delivering the fibers to a mixing apparatus to mechanically mix the fibers; then subjecting the fibers to a fine opening treatment; then introducing the fibers into a feeding device for feeding the fibers uniformly; then delivering the fibers to a carding machine for forming a substantially uniform non-woven electret fibrous web; then obtaining a nonwoven electret fibrous web by cross-lapping; and finally forming the non-woven electret fibrous web by subjecting the nonwoven electret fibrous web to through-air bonding.

In another exemplary embodiment of the disclosure, the process can comprise the steps of: delivering the desired fibers into a coarse opening apparatus to coarsely open the fibers; then delivering the fibers to a mixing apparatus to mechanically mix the fibers; then subjecting the fibers to a fine opening treatment; then introducing the fibers into a feeding device for feeding the fibers uniformly; then delivering the fibers to an air laid machine for forming a substantially uniform non-woven electret fibrous web; and finally forming the non-woven electret fibrous web by subjecting the nonwoven electret fibrous web to needle punching process.

In another exemplary embodiment of the disclosure, the process can comprise the steps of: delivering the desired fibers into a coarse opening apparatus to coarsely open the fibers; then delivering the fibers to a mixing apparatus to mechanically mix the fibers; then subjecting the fibers to a fine opening treatment; then introducing the fibers into a feeding device for feeding the fibers uniformly; then delivering the fibers to an air-laid machine for forming a substantially uniform non-woven electret fibrous web; and finally forming the non-woven electret fibrous web by subjecting the nonwoven electret fibrous web to through-air bonding.

In some exemplary air-laying embodiments, the nonwoven electret fibrous webs may be formed using an air-laying method and apparatus (described in further detail in Examples B1-B9 below), which generally includes providing a forming chamber having an upper end and a lower end, introducing a plurality of fibers into the upper end of the forming chamber, transporting a population of the fibers to the lower end of the forming chamber as substantially discrete fibers, and collecting on a collector surface the population of substantially discrete fibers as a non-woven electret fibrous web.

In some such exemplary air-laying embodiments, the collector surface may have an identifiable pattern on a patterned collector surface, wherein the identifiable pattern comprises a plurality of non-hollow projections extending from a major surface of the non-woven electret fibrous web (as considered without the projections), and a plurality of substantially planar land areas formed between each adjoining projection in a plane defined by and substantially parallel with the major surface.

In further such exemplary embodiments of any of the foregoing air-laying methods, the patterned collector surface may include a plurality of geometrically shaped perforations extending through the collector, and capturing the population of fibers includes drawing a vacuum through the perforated patterned collector surface. In certain exemplary embodiments, the plurality of geometrically shaped perforations have a shape selected from circular, oval, polygonal, X-shape, V-shape, helical, and combinations thereof. In some particular exemplary embodiments, the plurality of geometrically shaped perforations have a polygonal shape selected from triangular, square, rectangular, diamond, trapezoidal, pentagonal, hexagonal, octagonal, and combinations thereof. In some particular exemplary embodiments, the plurality of geometrically shaped perforations includes a two-dimensional pattern on the patterned collector surface. In other exemplary embodiments, the two-dimensional pattern of geometrically shaped perforations on the patterned collector surface is a two-dimensional array.

In some exemplary embodiments of the foregoing air-laying methods, the method further includes bonding at least a portion of the plurality of fibers together without the use of an adhesive prior to removal of the web from the patterned collector surface, thereby causing the fibrous web to retain the identifiable pattern.

In further exemplary embodiments of the disclosure, the opening roller in the opening treatment can have a frequency of 30-50 Hz. In a further exemplary embodiment of the disclosure, the opening roller in the opening treatment can have a frequency of 40-50 Hz.

In additional exemplary embodiments of the disclosure, the nonwoven electret fibrous web obtained after the carding and cross-lapping or after the air-laid process can have a Basis Weight of 40 to 250 gsm. In another further exemplary embodiment of the disclosure, the nonwoven electret fibrous web obtained after the carding and cross-lapping or after the air-laid process can have a Basis Weight of 80 to 150 gsm.

In certain further exemplary embodiments of the disclosure, the bonding is needle punching process in which the needling frequency can be 100-1000 times/minute. In a specific exemplary embodiment of the disclosure, the needling frequency can be 250-500 times/minute.

In other further exemplary embodiments of the disclosure, the bonding is through-air bonding in which the hot air temperature is 130-150° C. In a specific exemplary embodiment of the disclosure, the hot air temperature is 135-145° C.

More specifically, the above described non-woven electret fibrous webs can be advantageously prepared by different processes applying unique sequences of steps to produce different non-woven electret fibrous webs. The detailed processes are described further below.

1. Processing Procedure I for Forming a Non-Woven Electret Fibrous Web

The desired fibers are weighed according to a formulation, put into a coarse opening apparatus, and opened using the spikes in the apparatus rotating at a high speed of 30-50 Hz. Then, the fibers are sent to a mixing apparatus for mechanically mixing the fibers. Then, the fibers are subjected to a fine opening treatment in a manner similar to that of the coarse opening treatment to further finely open the fibers. The fibers are introduced into a feeding device for feeding the fibers uniformly and the feeding amount is controlled. Then, the fibers are sent to the next process, that is, a carding machine for forming a substantially uniform non-woven electret fibrous web. In order to obtain a Basis Weight of 40-250 gsm, a nonwoven electret fibrous web can be obtained by cross-lapping. Finally, the nonwoven electret fibrous web is subjected to needle punching process at a frequency of 100-1000 times/minute so as to form the final product.

2. Processing Procedure II for Forming a Non-Woven Electret Fibrous Web

The desired fibers are weighed according to the demand of processing, put into a coarse opening apparatus, and opened using the spikes in the apparatus rotating at a high speed of 30-50 Hz. Then, the fibers are sent to a mixing apparatus for mechanically mixing the fibers. Then, the fibers are subjected to a fine opening treatment in a manner similar to that of the coarse opening treatment to further finely open the fibers. The fibers are introduced into a feeding device for feeding the fibers uniformly and the feeding amount is controlled. Then, the fibers are sent to the next process, that is, an air-laid machine for forming a substantially uniform non-woven electret fibrous web. Finally, the nonwoven electret fibrous web is subjected to needle punching process at a frequency of 100-1000 times/minute so as to form the final product with a Basis Weight of 40-250 gsm.

3. Processing Procedure III for Forming a Non-Woven Electret Fibrous Web

The desired fibers are weighed according to the demand of processing, put into a coarse opening apparatus, and opened using the spikes in the apparatus rotating at a high speed of 30-50 Hz. Then, the fibers are sent to a mixing apparatus for mechanically mixing the fibers. Then, the fibers are subjected to a fine opening treatment in a manner similar to that of the coarse opening treatment to further finely open the fibers. The fibers are introduced into a feeding device for feeding the fibers uniformly and the feeding amount is controlled. Then, the fibers are sent to the next process, that is, an air-laid machine for forming a substantially uniform non-woven electret fibrous web. In order to obtain a Basis Weight of 40-250 gsm, a nonwoven electret fibrous web can be obtained by cross-lapping. Finally, the nonwoven electret fibrous web is subjected to through-air bonding in an oven at a temperature of 130-150° C. so as to form the final product.

4. Processing Procedure IV for Forming a Non-Woven Electret Fibrous Web

The desired fibers are weighed according to the demand of processing, put into a coarse opening apparatus, and opened using the spikes in the apparatus rotating at a high speed of 30-50 Hz. Then, the fibers are sent to a mixing apparatus for mechanically mixing the fibers. Then, the fibers are subjected to a fine opening treatment in a manner similar to that of the coarse opening treatment to further finely open the fibers. The fibers are introduced into a feeding device for feeding the fibers uniformly and the feeding amount is controlled. Then, the fibers are sent to the next process, that is, an air-laid machine for forming a substantially uniform non-woven electret fibrous web. Finally, the nonwoven electret fibrous web is subjected to through-air bonding in an oven at a temperature of 130-150° C. so as to form the final product with a Basis Weight of 40-250 gsm.

Furthermore, the non-woven electret fibrous web can obtain different functions by adjusting the mixing ratios of different fibers.

5. Optional Processing Steps for Producing Nonwoven Electret Fibrous Webs

In addition to the foregoing methods of making a non-woven fibrous webs, one or more of the following process steps may be carried out. Alone or in combination, on the nonwoven fibrous web once formed:

(1) advancing the nonwoven fibrous web along a process pathway toward further processing operations;

(2) bringing one or more additional layers into contact with an outer surface of the nonwoven fibrous web;

(3) calendering the nonwoven fibrous web;

(4) pleating the nonwoven fibrous web, particularly after calendaring;

(5) coating the nonwoven fibrous web with a surface treatment or other composition (e.g., a fire retardant composition, an adhesive composition, or a print layer);

(6) attaching the nonwoven fibrous web to a cardboard or plastic tube;

(7) winding-up the nonwoven fibrous web in the form of a roll;

(8) slitting the nonwoven fibrous web to form two or more slit rolls and/or a plurality of slit sheets;

(9) placing the nonwoven fibrous web into a mold and molding the nonwoven fibrous web into a new shape;

(10) applying a release liner over an exposed optional pressure-sensitive adhesive layer, when present; and

(11) attaching the nonwoven fibrous web to another substrate via an adhesive or any other attachment device including, but not limited to, clips, brackets, bolts/screws, nails, and straps.

G. Methods of Making Non-Woven Electret Fibrous Web with Optional Particulates

The disclosure also provides various methods of making a non-woven electret fibrous webs including a plurality of particulates, more preferably chemically-active particulates, even more preferably granulated activated carbon, according to any of the foregoing embodiments. Suitable processes for preparing a non-woven electret fibrous webs comprising particulates generally comprise the steps of subjecting the electret fibers, the photo-catalytic fibers if present, the multi-component fibers if present, the mono-component thermoplastic fibers if present, and the carbon-based fibers if present, to an opening process, then carrying out the following steps to form a non-woven electret fibrous web containing particulates: delivering the fibers and the particulates to one or more feeding devices, mixing the fibers and the particulates, then carding or air laying the mixed fibers and particulates, then bonding the nonwoven electrets fibrous web containing the fibers and the particulates. In certain exemplary embodiments, the non-woven electret fibrous web is formed using a carding and cross-lapping method, or an air laying method, to form the non-woven electret fibrous web. An air-laying method is currently preferred.

Thus, in certain exemplary embodiments of the foregoing air-laying methods, the method further includes introducing a plurality of particulates, which may be chemically active particulates, into the forming chamber and mixing the plurality of discrete fibers with the plurality of particulates within the forming chamber to form a fibrous particulate mixture before capturing the population of substantially discrete fibers as a non-woven electret fibrous web, and securing at least a portion of the particulates to the non-woven electret fibrous web.

In any of the foregoing air-laying embodiments, the particulates may be introduced into the forming chamber at the upper end, at the lower end, between the upper end and the lower end, or a combination thereof. In certain exemplary embodiments of the foregoing air-laying methods, transporting the fibrous particulate mixture to the lower end of the forming chamber to form a non-woven electret fibrous web comprises dropping the discrete fibers into the forming chamber and permitting the fibers to drop through the forming chamber under the force of gravity. In other exemplary embodiments, transporting the fibrous particulate mixture to the lower end of the forming chamber to form a non-woven electret fibrous web comprises dropping the discrete fibers into the forming chamber and permitting the fibers to drop through the forming chamber under the forces of gravity and a vacuum force applied to the lower end of the forming chamber.

In further exemplary embodiments of the foregoing air-laying methods, the non-woven electret fibrous web may be processed to obtain a pleated web having a corrugated or pleated structure to increase the overall surface area available for entrapment or adsorption of airborne contaminants. In some such embodiments, the pleated web may be formed by air-laying the web components onto a patterned perforated collector (as described in detail above) having a three-dimensional corrugated pattern comprising, for example, a plurality of V-shaped lands and grooves, while passing an air stream through the perforations in the patterned perforated collector; the formed nonwoven fibrous web is subsequently subjected to a fiber bonding process.

In some exemplary embodiments wherein more than 0% and less than 10% wt. of the non-woven electret fibrous web, more preferably more than 0% and less than 10% wt. of the discrete fibers, is comprised of multi-component fibers comprising at least a first region having a first melting temperature and a second region having a second melting temperature wherein the first melting temperature is less than the second melting temperature, securing the particulates to the non-woven electret fibrous web comprises heating the multi-component fibers to a temperature of at least the first melting temperature and less than the second melting temperature, whereby at least a portion of the particulates are bonded to the at least first region of at least a portion of the multi-component fibers, and at least a portion of the discrete fibers are bonded together at a plurality of intersection points with the first region of the multi-component fibers.

In any of the foregoing embodiments, the plurality of discrete fibers may include a first population of mono-component thermoplastic thermoplastic fibers having a first melting temperature, and a second population of mono-component thermoplastic fibers having a second melting temperature greater than the first melting temperature, securing the particulates to the non-woven electret fibrous web comprises heating the thermoplastic fibers to a temperature of at least the first melting temperature and less than the second melting temperature, whereby at least a portion of the particulates are bonded to at least a portion of the first population of mono-component thermoplastic fibers, and further wherein at least a portion of the first population of mono-component thermoplastic fibers is bonded to at least a portion of the second population of mono-component thermoplastic fibers.

In some exemplary embodiments comprising a first population of mono-component thermoplastic thermoplastic fibers having a first melting temperature and a second population of mono-component thermoplastic fibers having a second melting temperature greater than the first melting temperature, preferably more than 0% and less than 10% wt. of the non-woven electret fibrous web, more preferably more than 0% and less than 10% wt. of the discrete fibers, is comprised of the first population of mono-component thermoplastic thermoplastic.

In certain exemplary embodiments, securing the particulates to the non-woven electret fibrous web comprises heating the first population of mono-component thermoplastic thermoplastic fibers to a temperature of at least the first melting temperature and less than the second melting temperature, whereby at least a portion of the particulates are bonded to at least a portion of the first population of mono-component thermoplastic thermoplastic fibers, and at least a portion of the discrete fibers are bonded together at a plurality of intersection points with the first population of mono-component thermoplastic thermoplastic fibers.

In any of the foregoing exemplary embodiments, securing the particulates to the non-woven electret fibrous web comprises at least one of thermal bonding, autogenous bonding, adhesive bonding, powdered binder binding, hydroentangling, needlepunching, calendering, or a combination thereof. In some of the foregoing embodiments, securing the particulates to the non-woven electret fibrous web comprises entangling the discrete fibers, thereby forming a cohesive non-woven electret fibrous web including a plurality of interstitial voids, each interstitial void defining a void volume having at least one opening having a median dimension defined by at least two overlapping fibers, wherein the particulates exhibit a volume less than the void volume and a median particulate size greater than the median dimension, further wherein the chemically active particulates are not substantially bonded to the discrete fibers and the discrete fibers are not substantially bonded to each other.

In any of the foregoing exemplary embodiments, a liquid may be introduced into the forming chamber to wet at least a portion of the discrete fibers, whereby at least a portion of the particulates adhere to the wetted discrete fibers in the forming chamber.

In any of the foregoing embodiments, the non-woven electret fibrous web may be formed on a collector, wherein the collector is selected from a screen, a scrim, a mesh, a non-woven fabric, a woven fabric, a knitted fabric, a foam layer, a porous film, a perforated film, an array of fibers, a melt-fibrillated non-woven electret fibrous web, a melt-blown fibrous web, a spun bond fibrous web, an air-laid fibrous web, a wet-laid fibrous web, a carded fibrous web, a hydro-entangled fibrous web, and combinations thereof.

In other examples of any of the foregoing embodiments, the method further comprises applying a fibrous cover layer overlaying the non-woven electret fibrous web, wherein the fibrous cover layer is formed by air-laying, wet-laying, carding, melt blowing, melt spinning, electrospinning, plexifilament formation, gas jet fibrillation, fiber splitting, or a combination thereof. In certain exemplary embodiments, the fibrous cover layer comprises a population of sub-micrometer fibers having a median fiber diameter of less than 1 µm formed by melt blowing, melt spinning, electrospinning, plexifilament formation, gas jet fibrillation, fiber splitting, or a combination thereof.

Through some embodiments of the process described below, it is possible to obtain the particulates preferentially on one surface of the non-woven article. For open, lofty non-woven webs, the particulates will fall through the web and preferentially be on the bottom of the non-woven article. For dense non-woven webs, the particulates will remain on the surface and preferentially be on the top of the non-woven article.

Further, as described below, it is possible to obtain a distribution of the particulates throughout the thickness of the non-woven article. In this embodiment, the particulate therefore is available on both working surfaces of the web and throughout the thickness. In one embodiment, the fibers can be wetted to aid in the clinging the particulate to the fibers until the fiber can be melted to secure the particulates. In another embodiment, for dense non-woven webs, a vacuum can be introduced to pull the particulates throughout the thickness of the non-woven article.

In further exemplary embodiments, the non-woven electret fibrous web may be formed by calendaring and mechanically pleating a bonded nonwoven fibrous web formed by carding and cross-lapping or air-laying. The pleated web includes electret fibers and one or both of a plurality of photo-catalytic fibers and a plurality of chemically-active particulates, preferably granulated activated carbon particulates; and optionally one or more of a plurality of multi-component fibers, a plurality of mono-component thermoplastic fibers, and a plurality of carbon-based fibers.

H. Methods of Using Non-Woven Electret Fibrous Webs

The present disclosure is also directed to methods of using the nonwoven fibrous webs of the present disclosure in a variety of applications. Thus, in yet another aspect, the disclosure relates to articles comprising any of the nonwoven fibrous webs described above prepared according to any of the foregoing methods. Certain particulate-free patterned air-laid nonwoven electret fibrous webs may be useful as a gas filtration article, a heating, cooling or ventilation (HVAC) air filter, a cabin air filter for vehicle applications, or a surface cleaning article. For example, exemplary fibrous webs of the present disclosure may provide a particularly effective textured surface for use in a wipe for surface cleaning, because the pattern may have the advantage of providing a reservoir for cleaning agents and high surface for trapping debris.

In certain presently preferred embodiments, the nonwoven electret fibrous webs of any of the foregoing embodiments may be used to make a gas filtration article comprising a gas-impermeable housing surrounding the nonwoven electret fibrous web, the housing comprising at least one gas inlet in fluid communication with a first major surface of the nonwoven electret fibrous web, and at least one gas outlet in fluid communication with a second major surface of the nonwoven electret fibrous web opposite the first major surface of the nonwoven electret fibrous web.

It is understood that a variety of gas filtration articles can be made from various nonwoven electret fibrous webs containing various particulates, which are preferably chemically active particulates. Gas (e.g. air) filtration media, furnace filters, respirators, and the like could be beneficially manufactured to include nonwoven electret fibrous webs containing particulates, more preferably chemically active particulates.

In other exemplary embodiments (not shown), additional layers may be formed by additional overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the patterned air-laid nonwoven electret fibrous web.

The gas filtration article may take a variety of shapes and forms. In certain exemplary embodiments, the gas filtration article takes the form of a three-dimensional geometric shape, which in certain exemplary embodiments, may be selected from a cylinder, a circular disc, an elliptical disk, or a polygonal disk. Other suitable shapes and forms are known to those skilled in the art.

A further aspect provides a method of filtering a gas, the method comprising contacting a gas filtration article with a permeating gas. In certain exemplary embodiments, the gas filtration article comprises a pleated nonwoven electret fibrous, and optionally, a plurality of sorbent particulates (e.g. granular activated carbon particulates) entrapped in the web.

Various exemplary embodiments of non-woven electret fibrous webs have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

The raw materials used in the following preparative examples, examples and comparative examples are all commercially available, as described in detail below in Table A.

TABLE A

| Example | Trade Designation | Supplier | Material Type | Properties |
|---|---|---|---|---|
| A1, A2 & A9 | FILTRETE ™ Fibers | 3M Company (Breda, The Netherlands) | Polypropylene (PP) Charged Electret Fibers | Rectangular cross section of 10 μm × 40 μm and a length of 90 mm |
| A1, A2 & A9 | Honey Comb Light Photocatalyst Fibers | SHANGYU HONGQIANG COLOURED POLYESTER CO., LTD (Peoples Republic of China) | Photo-catalytic fibers | 1.5 D × 38 mm |
| A3 & A4 | FILTRETE ™ Fibers | 3M Company (Breda, The Netherlands) | Polypropylene (PP) Charged Electret Fibers | Rectangular cross section of 10 μm × 40 μm and a length of 90 mm |
| A3 & A4 | Honey Comb Light Photocatalyst Fibers | SHANGYU HONGQIANG COLOURED POLYESTER CO., LTD (Peoples Republic of China) | Photo-catalytic fibers | 1.5 D × 38 mm |
| A3 & A4 | Honey Comb Bamboo Charcoal Fibers | SHANGYU HONGQIANG COLOURED POLYESTER CO., LTD. (Peoples Republic of China) | Bamboo charcoal fibers | 1.5 D × 38 mm |
| A5 & A6 | FILTRETE ™ Fibers | 3M Company (Breda, The Netherlands) | Polypropylene (PP) Charged Electret Fibers | Rectangular cross section of 10 μm × 40 μm and a length of 90 mm |
| A5 & A6 | Honey Comb Light Photocatalyst Fibers | SHANGYU HONGQIANG COLOURED POLYESTER CO., LTD (Peoples Republic of China) | Photo-catalytic fibers | 1.5 D × 38 mm |
| A5 & A6 | COCOTEX ® Coconut Charcoal PET Fibers | SHANGHAI NANTEC TEXTILE CO., LTD. (Peoples Republic of China) | Coconut charcoal fibers | 1.5 D × 38 mm |
| A7 & A8 | FILTRETE ™ Fibers | 3M Company (Breda, The Netherlands) | Polypropylene (PP) Charged Electret Fibers | Rectangular cross section of 10 μm × 40 μm and a length of 90 mm |
| A7 & A8 | Honey Comb Light Photocatalyst Fibers | SHANGYU HONGQIANG COLOURED POLYESTER CO., LTD (Peoples Republic of China) | Photo-catalytic fibers | 1.5 D × 38 mm |
| A7 & A8 | Poly lactic acid (PLA) fibers | HAINING XINNENG FIBERS CO. LTD. (Peoples Republic of China) | Poly Lactic Acid | 1.5 D × 38 mm |

TABLE A-continued

| Example | Trade Designation | Supplier | Material Type | Properties |
|---|---|---|---|---|
| Comparative 1 | FILTRETE ™ Fibers | 3M Company (Breda, The Netherlands) | Polypropylene (PP) Charged Electret Fibers | Rectangular cross section of 10 μm × 40 μm and a length of 90 mm |
| Comparative 2 | Honey Comb Light Photocatalyst Fibers | SHANGYU HONGQIANG COLOURED POLYESTER CO., LTD (Peoples Republic of China) | Photo-catalytic fibers | 1.5 D × 38 mm |
| B1 (Lot C) | T255 | Trevira GmbH (Bobingen-Germany) | Bi-component Fibers Core: Polyethylene terephthalate (PET) Sheath: Modified Polyethylene (PE) | Decitex: 6.7 Length: 3 mm |
| B1 (Lot C) | FILTRETE ™ | 3M Company (Breda, The Netherlands) | Polypropylene (PP) Charged Electret Fibers | Cut length: 3 mm |
| B1 (Lot C) | GAC-CTC60 | Donau Carbon GmbH (Frankfurt, Germany) | Granulated Activated Carbon | 30×60 mesh |
| B1 (Lot C) | Pegatex | PEGAS Nonwovens SRO (Znojmo, Czech Republic) | Spunbond Polypropylene Fibers (PP) | Basis Weight: 10 gsm |
| B2, B3 & B4 (Lot E, F & H) | T255 | Trevira GmbH (Bobingen-Germany) | Bi-component Fibers Core: Polyethylene terephthalate (PET) Sheath: Modified Polyethylene (PE) | Decitex: 6.7 Length: 4 mm |
| B2, B3 & B4 (Lot E, F & H) | FILTRETE ™ | 3M Company (Breda, The Netherlands)) | Polypropylene (PP) Charged Electret Fibers | Cut length: 3 mm |
| B2, B3 & B4 (Lot E, F & H) | GAC-CTC60 | Donau Carbon GmbH (Frankfurt, Germany) | Granulated Activated Carbon | 30×60 |
| B2, B3 & B4 (Lot E, F & H) | Pegatex | PEGAS Nonwovens SRO (Znojmo, Czech Republic) | Spunbond Polypropylene Fibers (PP) | Basis Weight: 10 gsm |
| B5, B6 & B7 (Lot M, O & P) | FILTRETE ™ | 3M Company (Breda, The Netherlands) | Polypropylene (PP) Charged Electret Fibers | Cut length: 3 mm |
| B5, B6 & B7 (Lot M, O & P) | GAC-CTC60 | Donau Carbon GmbH (Frankfurt, Germany) | Granulated Activated Carbon | 30×60 |
| B5, B6 & B7 (Lot M, O & P) | Pegatex | PEGAS Nonwovens SRO (Znojmo, Czech Republic) | Spunbond Polypropylene Fibers (PP) | Basis Weight: 10 gsm |

The following fibers are exemplary filling fibers used in additional examples of nonwoven fibrous webs including mono-component thermoplastic fibers:

Polyethylene terephthalate (PET) mono-component thermoplastic fibers with a specification of 2 D×51 mm purchased from HUIWEISHI CO. LTD. or FAR EASTERN INDUSTRY CO. LTD. (Peoples Republic of China); and Polyethylene (PE) mono-component thermoplastic fibers with a specification of 3 D×51 mm purchased from GUANGZHOU YIAISI FIBER CO. LTD. (Peoples Republic of China).

Test Methods

Basis Weight Measurement

The basis weight for exemplary non-woven electret fibrous webs containing granulated activated carbon and electret fibers was measured with a weighing scale Mettler Toledo XS4002S, (commercially available from Mettler-Toledo SAS, Viroflay, France).

Thickness Measurement

The thickness of the flat filter media was measured using a MITUTOYO Caliper Model ID-C1050B (commercially available from Mitutoyo, Paris, France)

Pressure Drop, Particulate Capture Efficiency and Loading Performance

Pressure drop, fractional efficiency and loading performance of pleated and framed filters were measured in a vertical duct system. DIN 71 460 part 1 is used as a guideline. Main test equipment: Particle Counter APS Model 3400A (commercially available from TSI, Inc., Shoreview, Minn.), Aerosol Generator: Palas Brush Generator RGB 1000 SEA fine loading (commercially available from Palas GmbH, Karlsruhe, Germany).

Air Permeability

The air permeability of the various webs has been measured using a TEXTEST FX3000 Air Permeability Tester III (commercially available from TEXTEST AG, Schwerzenbach, Switzerland).

Odor Filter Performance: Gas and Vapor Performance Test (Adsorption Efficiency)

Pleated filters were tested for the odor filter capability. The gas and vapor efficiency is determined with DIN 71-460-2 as a guideline. Specific filter challenges used were: n-butane, sulfur dioxide ($SO_2$) and toluene. The test equipment used was a Model ML9850 Gas Analyzer for $SO_2$ (commercially available from Teledyne Monitor Labs, Inc., Englewood, Colo.), and a Model FID 2010T chromatograph for n-butane and toluene (commercially available from Testa GmbH, Munich, Germany).

A. Preparation of Non-Woven Electret Fibrous Webs Including Electret and Photo-Catalytic Fibers

Example A1

A non-woven electret fibrous web is prepared from 0.5 kg of the electret fiber and 9.5 kg of the photo-catalytic fiber according to the processing procedure as described below.

1. Firstly, the electret fibers and the photo-catalytic fibers are mixed uniformly and then subjected to coarse opening and fine opening respectively wherein each opening rollers has a frequency of 50 Hz so as to change the fiber block into fine fiber bundles. Additionally, the impurities in the raw material are filtered.

2. Then, the fiber bundles are fed into a carding machine via a feeding box to card the fiber bundles in a single fiber-arranged state. Then, the carded fibers are output via a doffer to form a substantially uniform non-woven electret fibrous web with a Basis Weight of 10 gsm.

3. When the nonwoven electret fibrous web is introduced into a cross-lapper, the number of laying layers is controlled by the cross-lapper and the speed of convey belt to achieve a desired Basis Weight of 90 gsm and improve the uniformity of the nonwoven electret fibrous web.

4. Next, the laminated nonwoven electret fibrous webs are subjected to needle punching process at a needling frequency of 350 times/minute in order to improve the strength of the nonwoven electret fibrous web.

5. Finally, the nonwoven electret fibrous web could be slit and wound according to the desired width.

Example A2

A non-woven electret fibrous web is prepared from 5 kg of the electret fiber and 5 kg of the photo-catalytic fiber according to the processing procedure as described below.

1. Firstly, the electret fibers and the photo-catalytic fibers are mixed uniformly and then subjected to coarse opening and fine opening respectively wherein each opening rollers has a frequency of 50 Hz so as to change the fiber block into fine fiber bundles. Additional, the impurities in the raw material are filtered.

2. Then, the fiber bundles are fed into a Rando air-laid machine via a feeding box to change the fiber bundles into a random state by processing the fiber bundles with a lickerin roll under the action of air stream. A uniform nonwoven electret fibrous web with a Basis Weight of 90 gsm is output.

3. Next, the laminated nonwoven electret fibrous webs are subjected to needle punching process at a needling frequency of 350 times/minute in order to improve the strength of the nonwoven electret fibrous web.

4. Finally, the nonwoven electret fibrous web could be slit and wound according to the desired width.

Example A3

A non-woven electret fibrous web is prepared from 1 kg of the electret fiber, 8 kg of the bamboo charcoal fiber, and 1 kg of the photo-catalytic fiber according to the processing procedure as described in Example A1.

Example A4

A non-woven electret fibrous web is prepared from 4 kg of the electret fiber, 5 kg of the bamboo charcoal fiber, and 1 kg of the photo-catalytic fiber according to the processing procedure as described in Example A2.

Example A5

A non-woven electret fibrous web is prepared from 1 kg of the electret fiber, 8 kg of the coconut charcoal fiber, and 1 kg of the photo-catalytic fiber according to the processing procedure as described in Example A1.

Example A6

A non-woven electret fibrous web is prepared from 4 kg of the electret fiber, 5 kg of the coconut charcoal fiber, and 1 kg of the photo-catalytic fiber according to the processing procedure as described in Example 2.

Example A7

A non-woven electret fibrous web is prepared from 1 kg of the electret fiber, 8 kg of the photo-catalytic fiber and 1 kg of the binder fiber PLA according to the processing procedure as described below.

1. Firstly, the electret fibers, the photo-catalytic fibers and the binder fibers are mixed uniformly and then subjected to coarse opening and fine opening respectively wherein each opening rollers has a frequency of 50 Hz so as to change the fiber block into fine fiber bundles. Additional, the impurities in the raw material are filtered.

2. Then, the fiber bundles are fed into a carding machine via a feeding box to card the fiber bundles in a single fiber-arranged state. Then, the carded fibers are output via a doffer to form a substantially uniform non-woven electret fibrous web with a Basis Weight of 10 gsm.

3. When the nonwoven electret fibrous web is introduced into a cross-lapper, the number of laying layers is controlled by the cross-lapper and the speed of convey belt to achieve a desired Basis Weight of 90 gsm and improve the uniformity of the nonwoven electret fibrous web.

4. Next, the laminated nonwoven electret fibrous webs are subjected to through-air bonding in an oven at a temperature of 140° C. to bind the binder fibers and further improve the strength of the nonwoven electret fibrous web.

5. Finally, the nonwoven electret fibrous web could be slit and wound according to the desired width.

Example A8

A non-woven electret fibrous web is prepared from 4 kg of the electret fiber, 5 kg of the photo-catalytic fiber and 1 kg of the binder fiber PLA according to the processing procedure as described below.

1. Firstly, the electret fibers, the photo-catalytic fibers and the binder fibers are mixed uniformly according to an ingredient ratio and then subjected to coarse opening and fine opening respectively wherein each opening rollers has a frequency of 50 Hz so as to change the fiber block into fine fiber bundles. Additional, the impurities in the raw material are filtered.

2. Then, the fiber bundles are fed into a Rando air-laid machine via a feeding box to change the fiber bundles into a random state by processing the fiber bundles with a lickerin roll under the action of air stream. A uniform nonwoven electret fibrous web with a Basis Weight of 90 gsm is output.

3. Next, the laminated nonwoven electret fibrous webs are subjected to through-air bonding in an oven at a temperature of 145° C. to bind the binder fibers and further improve the strength of the nonwoven electret fibrous web.

4. Finally, the nonwoven electret fibrous web could be cut and wound according to the desired width.

Example A9

A non-woven electret fibrous web is prepared from 1 kg of the electret fiber and 9 kg a photo-catalytic fiber according to the processing procedure as described in Example A1.

Comparative Example 1

A non-woven electret fibrous web is prepared from 10 kg of the electret fiber according to the processing procedure as described in Example A1.

Comparative Example 2

A non-woven electret fibrous web is prepared from 10 kg a photo-catalytic fiber according to the processing procedure as described in Example A1.

Testing of Non-Woven Electret Fibrous Webs for Performance

The non-woven electret fibrous webs as prepared in representative Examples and Comparative Examples were subjected to the following testing for performance:

Particulate Capture Efficiency: measured according to GB2626-2006.

Differential pressure: measured according to GB2626-2006.

Gas permeability: measured according to GB/T 5453-1997.

Formaldehyde Removal Percentage: measured according to HPLC (EPATO-5).

Xylene Removal Percentage: measured according to GC/MS (JY/T 003-1996).

TABLE I

Particulate Capture Efficiency

| Example | Particulate Capture Efficienecy (%) |
|---|---|
| Example A1 | 90.8 |
| Example A2 | 53 |
| Example A9 | 81.6 |
| Comparative Example 1 | 8.39 |
| Comparative Example 2 | 100 |

TABLE II

Gas Permeability

| Example | Gas Permeability (L/m$^2$/s) |
|---|---|
| Example A1 | 2224 |
| Example A2 | 1655 |
| Example A9 | 1299 |
| Comparative Example 1 | 1099 |
| Comparative Example 2 | 1581 |

The non-woven electret fibrous web obtained in Example A2 had the following performance:

TABLE III

Non-woven Electret Fibrous Web Performance

| Basis Weight (gsm) | Particulate Capture Efficiency (%) | Differential Pressure (mm H$_2$O) | Gas Permeability (L/m$^2$/s) | Formaldehyde Removal Percentage (%) | Xylene Removal Percentage (%) |
|---|---|---|---|---|---|
| 90 | 53 | 0.8 | 1655 | 76.4 | 47.1 |

B. Preparation of Pleated Air-Laid Non-Woven Electret Fibrous Webs Including Granulated Activated Carbon In each of the following Examples, a SPIKE air-laying forming apparatus (commercially available from FormFiber NV, Denmark) was used to prepare non-woven electret fibrous webs containing a plurality of discrete fibers and optionally a plurality of particulates. Details of the SPIKE apparatus and methods of using the SPIKE apparatus in forming air-laid webs is described in U.S. Pat. Nos. 7,491,354 and 6,808,664.

Preparation of the Bi-Component Fibers

The performance of the filter material is considerably affected by the presence of lubricants and anti-static agents (collectively known as a "spin finish") on the surface of the fibres. In practise, polymer fibres produced commercially have spin finishes, and thus it is necessary to substantially remove lubricants and anti-static agents from the fibres before blending of said fibres.

The bi-component fibers as received from the vendor were washed free of any spin finish by 3 successive immersions in cold water. The washed fibers were squeezed to remove excess water between each immersion. The washed fibers were then been dried with blown air to remove completely any remaining water. This drying process was applied to each type of fiber.

Preparation of the Filtrete™ Fibers

The Filtrete fibers were cut to length by MiniFibers, Inc. (Johnson City, Tenn.) and then opened using blown air to produce opened (de-clumped) individual fibers.

Pleating of the Non-Woven Electret Fibrous Web

The pleating process was performed on a JCEM Pleater Model P-CNC, P2-Generation (commercially-available from JCEM GmbH, Fulenbach, Switzerland) using the following parameters:
- Pleating speed: 30-150 pleats per minute
- Gap Blades/Plates: 0.5 mm to 1.6 mm
- Soft touch: 0.8 to 1.2
- Temperature: 150° C.
- Teflon Tape: Both blades wrapped
- Pressure Shoes: 2.0 bar to 4.0 bar

Example B1 (Lot C)—Air-Laid Non-Woven Electret Fibrous Web

The electret fibers and the washed bi-component fibers were fed into a split pre-opening and blending chamber with two rotating spike rollers with a conveyor belt having a width of 0.6 m at a velocity 0.74 m/min.

The washed bi-component fibers (6.7 dtex by 3 mm) were fed to the chamber on the conveyor belt with a mass flowrate of 22.2 g/min. The electret fibers were fed to the chamber on the conveyor belt with a mass flowrate of 22.2 g/min. The granulated activated carbon (GAC) was fed on the top belt from the SPIKE equipment at 480 g/min.

Thereafter, the blend was fed into the top of the forming chamber having a blower having a flow rate of 2300 m$^3$/hour and set up at 100% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen. The fibers were pulled down on a porous endless belt/wire by a combination of gravity and vacuum applied to the forming chamber from the lower end of the porous forming belt/wire.

A support layer of the type Pegatex 10 gsm (Support Layer 1) was fed into the forming chamber on the top surface of the endless forming belt/wire running at the lower end of the forming chamber moving at a speed of 1.5 m/min. The materials were collected on the conveying belt thereby forming a three-dimensional non-woven electret fibrous web containing the GAC particulates supported by the support layer underneath.

The web was then conveyed into a gas oven (150° C.) with a line speed of 1.5 m/min, which melts the sheath of the bi-component fibers. The oven was a gas-fired oven (commercially-available from SANTEX group, Tobel, Switzerland). The oven has two heating chamber with a total of 4 meters in length; the principle is air blowing in the chamber from the top and the bottom. The circulation can be set so that a part of the blown air can be evacuated (20 to 100% setup) and a part can be re-circulated (20-100% setup). In this example the air was evacuated at 80% setting and re-circulated at 20%, the temperature was 150° C. in the chamber. The resulting web was a flexible web and was visually observed to have GAC particles homogenously distributed within the obtained three-dimensional web.

This resulting web was then calendered with an additional top layer of the same Pegatex 10 gsm spun bond nonwoven fibrous web. The calendar was running at 1.5 m/min with both steel cylinders heated at 150° C. and adjusted to have a gap between cylinders of 1.25 mm. The calendar was a two steel rolls calendar engineered and manufactured by Energy Solutions International, Inc. (St Paul, Minn.). The total web weight was 560 g/m$^2$ and thickness was 1.8 mm. The average permeability was ranging from 800 L/m$^2$/s to 900 L/m$^2$/s. This medium was not pleatable with the JCEM pleater within the above-referenced pleating parameter range.

Example B2 (Lot E)—Air-Laid Non-Woven Electret Fibrous Web

In a like manner to Example B1, the washed bi-component fibers (6.7 dtex by 4 mm) were fed with a mass flowrate of 43.5 g/min to the chamber onto this conveyor belt running at a velocity of 0.68 m/min. The electret fibers were fed with a mass flowrate of 43.5 g/min to this chamber onto this conveyor belt at the same speed. The GAC was fed on the top belt from the SPIKE equipment at 432 g/min. All other settings were identical to Example B1 except the following:

The medium was calendered 2 times using the following parameters: gap of 1.15 mm at a speed of 1 m/min, then gap of 1 mm at a speed of 0.5 m/min.

Resulting web was 536 g/m$^2$ with an average thickness of 1.6 mm. The average permeability was ranging from 550 L/m$^2$/s to 700 L/m$^2$/s. This medium was stiff enough to be pleated on the JCEM pleater delivering a constant pleatpack.

On the pleated filter the pressure drop measured @ 200 [m3/hr] was 131 Pascal. Fractional efficiency: (SAE fine 0.5-1 micrometer) was 82.8%.

Example B3 (Lot F)—Air-Laid Non-Woven Electret Fibrous Web

In a like manner to Example B1, the washed bi-component fibers were fed with a mass flowrate of 20.5 g/min to this chamber onto this conveyor belt running at a velocity of 0.68 m/min. The electret fibers were fed with a mass flowrate of 43.5 g/min to this chamber onto this conveyor belt at the same speed. The GAC was fed on the top belt from the SPIKE equipment at 432 g/min. All other settings were identical to Example B1 except the following:

The medium has been placed in the oven at 1 m/min and then calendered with a gap of 0.85 mm at a speed of 1 m/min.

Resulting web was 472 g/m$^2$ with an average thickness of 1.3 mm. The average permeability ranged from 700 L/m$^2$/s to 750 L/m$^2$/s. This medium was less stiff than Lot F but still delivering a constant pleatpack on the JCEM pleater.

On the pleated filter the pressure drop measured @ 200 [m3/hr] was 91 Pascal. Fractional efficiency: (SAE fine 0.5-1 micrometer) was a 58.1%. The Gas and Vapor Performance Test (Adsorption Efficiency) for butane (5 min.) was 58.9%. The Gas and Vapor Performance Test (Adsorption Efficiency) for $SO_2$ (5 min.) was 56.1%

Example B4 (Lot H)—Air-Laid Non-Woven Electret Fibrous Web

In a like manner to Example B1, the washed bi-component fibers were fed with a mass flowrate of 43.5 g/min to this chamber onto this conveyor belt running at a velocity of 0.68 m/min. The electret fibers were fed with a mass flowrate of 43.5 g/min to this chamber onto this conveyor belt at the same speed. The GAC was fed on the top belt from the SPIKE equipment at 432 g/min. All other settings were identical to Example B1 except the following:

The medium has been placed in the oven at 1 m/min and then calendered with a gap of 1.1 mm at a speed of 1 m/min. The resulting web was 553 g/m$^2$ with an average thickness of 1.5 mm. The average permeability was around 780

L/m²/s. This medium was relatively soft (more than lot E &F) but could still be pleated on the JCEM pleater.

On the pleated filter the pressure drop measured @ 200 [m³/hr] was 59.6 Pascal. Fractional efficiency: (SAE fine 0.5-1 micrometer) was 87.9%. The Gas and Vapor Performance Test (Adsorption Efficiency) for butane (5 min.) was 53.6%. The Gas and Vapor Performance Test (Adsorption Efficiency) for $SO_2$ (5 min.) was 41.1%. The Gas and Vapor Performance Test (Adsorption Efficiency) for Toluene (5 min) was 91.9%

Example B5 (Lot M)—Air-Laid Non-Woven Electret Fibrous Web

In a like manner to Example B1, the washed bi-component fibers (9 dtex by 3 mm) were fed with a mass flowrate of 24.5 g/min to this chamber onto this conveyor belt running at a velocity of 0.68 m/min. The electret fibers were fed with a mass flowrate of 43.5 g/min to this chamber onto this conveyor belt at the same speed. The GAC was fed on the top belt from the SPIKE equipment at 432 g/min. All other settings were identical to Example B1 except the following:

The medium has been placed in the oven at 1 m/min and then calendered with a gap of 1.1 mm at a speed of 1 m/min. Resulting web was 508 g/m² with an average thickness of 1.8 mm. The average permeability was around 900 L/m²/s. This medium was very soft (more than lot H) but could still be pleated on the JCEM pleater. Testing revealed a tendency to pleat collapse at 600 m³/hour.

Example B6 (Lot O)—Air-Laid Non-Woven Electret Fibrous Web

In a like manner to Example B1, the washed bi-component fibers (9 dtex by 3 mm) were fed with a mass flowrate of 24.5 g/min to this chamber onto this conveyor belt running at a velocity of 0.68 m/min. The electret fibers were fed with a mass flowrate of 40.8 g/min to this chamber onto this conveyor belt at the same speed. The GAC was fed on the top belt from the SPIKE equipment at 432 g/min. All other settings were identical to Example B1 except the following:

The medium has been placed in the oven at 1 m/min and then calendered with a gap of 1.1 mm at a speed of 1 m/min. Resulting web was 507 g/m² with an average thickness of 1.8 mm. The average permeability was around 845 L/m²/s. This medium was stiff enough to be pleated on the JCEM pleater (better than lot M), delivering a constant pleatpack.

On the pleated filter the pressure drop measured @ 200 [m³/hr] was 45.2 Pascal. Fractional efficiency: (SAE fine 0.5-1 micrometer) was 84.0%. The Gas and Vapor Performance Test (Adsorption Efficiency) for butane (5 min) was 31.7%. The Gas and Vapor Performance Test (Adsorption Efficiency) for $SO_2$ (5 min.) was 45.5%. The Gas and Vapor Performance Test (Adsorption Efficiency) for Toluene (5 min.) was 91.9%.

Example B7 (Lot P)—Air-Laid Non-Woven Electret Fibrous Web

In a like manner to Example B1, the washed bi-component fibers (9 dtex by 3 mm) were fed with a mass flowrate of 24.5 g/min to this chamber onto this conveyor belt running at a velocity of 0.68 m/min. The electret fibers were fed with a mass flowrate of 40.8 g/min to this chamber onto this conveyor belt at the same speed. The GAC was lowered for this trial. It was fed on the top belt from the SPIKE equipment at 384 g/min. All other settings were identical to Example B1 except the following:

The medium has been placed in the oven at 1 m/min and then calendered with a gap of 0.9 mm at a speed of 1 m/min. Resulting web was 349 g/m² with an average thickness of 1.6 mm. The average permeability was around 845 l/m²/s. This medium was soft but still pleatable on the JCEM pleater.

On the pleated filter the pressure drop measured @ 200 [m³/hr] was 44.1 Pascal. Fractional efficiency: (SAE fine 0.5-1 micrometer) was 80.8%. The Gas and Vapor Performance Test (Adsorption Efficiency) for butane (5 min) was 24.5%. The Gas and Vapor Performance Test (Adsorption Efficiency) for $SO_2$ (5 min.) was 36.1%.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A non-woven electret fibrous web comprising:
   a single layer including a plurality of randomly oriented discrete fibers, the fibers including:
   a plurality of electret fibers;
   a plurality of photo-catalytic fibers;
   a plurality of multi-component fibers; and optionally,
   at least one of a plurality of chemically-active particulates, a plurality of carbon-based fibers or a plurality of mono-component thermoplastic fibers.

2. The non-woven electret fibrous web of claim 1 comprising a plurality of photo-catalytic fibers, wherein the weight ratio of the electret fibers to the photo-catalytic fibers is 1:19 to 19:1.

3. The non-woven electret fibrous web of claim 1 comprising a plurality of multi-component fibers, wherein the weight percentage of the multi-component fibers in the non-woven electret fibrous web is greater than 0% and less than 10% by weight, based on the total weight of the non-woven electret fibrous web.

4. The non-woven electret fibrous web of claim 1 comprising a plurality of chemically-active particulates in the form of granulated activated carbon, wherein the weight percentage of the chemically-active particulates is from 10% to 60% by weight, based on the total weight of the non-woven electret fibrous web, optionally wherein the non-woven electret fibrous web is pleated.

5. The non-woven electret fibrous web of claim 1, wherein the non-woven electret fibrous web further comprises a plurality of carbon-based fibers selected from a bamboo charcoal fiber and a coconut charcoal fiber, wherein the weight percentage of the carbon-based fibers in the non-woven electret fibrous web is 30 to 85% by weight, the weight percentage of the electret fibers in the non-woven electret fibrous web is 10 to 60% by weight, the weight percentage of the chemically-active particulates if present in the non-woven electret fibrous web is 10% to 60% by weight, and the weight percentage of the photo-catalytic fibers if present in the non-woven electret fibrous web is 5 to 20% by weight, based on the total weight of the non-woven electret fibrous web.

6. The non-woven electret fibrous web of claim 1, wherein the non-woven electret fibrous web further comprises a plurality of mono-component thermoplastic fibers, wherein the weight percentage of the mono-component thermoplastic fibers in the non-woven electret fibrous web is 5 to 30% by weight, the weight percentage of the electret fibers in the non-woven electret fibrous web is 5 to 60% by weight, the weight percentage of the carbon-based fibers if present in the non-woven electret fibrous web is 30 to 85% by weight, the weight percentage of the photo-catalytic fibers if present in the non-woven electret fibrous web is 5% to 80% by weight, and the weight percentage of the chemically-active particulates if present in the non-woven electret fibrous web is 10% to 60% by weight, based on the total weight of the non-woven electret fibrous web.

7. The non-woven electret fibrous web of claim 1, wherein the electret fibers are comprised of dielectric (co)polymeric fibers that have been subjected to an electrostatic charging process.

8. The non-woven electret fibrous web of claim 1, wherein the photo-catalytic fibers are selected from honey comb photo-catalytic fibers, synthetic fibers coated with nano-grade photo-catalytic particulates, and combinations thereof.

9. The non-woven electret fibrous web of claim 1, wherein the electret fibers have lengths of 10-100 nm, and cross sections that are circular or rectangular.

10. The non-woven electret fibrous web of claim 1, wherein the photo-catalytic fibers have lengths of 10-100 nm and fineness values of 0.5-20 deniers.

11. The non-woven electret fibrous web of claim 1, wherein the mono-component thermoplastic fibers are selected from a polyethylene terephthalate (PET) mono-component thermoplastic fiber, a polyethylene (PE) mono-component thermoplastic fiber, or a poly lactic acid (PLA) mono-component thermoplastic fiber.

12. The non-woven electret fibrous web of claim 1, wherein the non-woven electret fibrous web has a Basis Weight of 40 to 250 gsm.

13. A process for preparing the non-woven electret fibrous web according to claim 1, comprising the steps of:
subjecting the electret fibers that are present, the photo-catalytic fibers that are present, the multi-component fibers that are present, the mono-component thermoplastic fibers if present, the plurality of chemically-active particulates if present, and the carbon-based fibers if present, to the following treatments to form the non-woven electret fibrous web:
opening the fibers that are present,
mixing the fibers that are present,
delivering the fibers that are present and the chemically-active particulates that are present to a feeding device,
then forming the non-woven electret fibrous web from the fibers that are present and the chemically-active particulates that are present by at least one of carding and cross-lapping or air-laying, and
thereafter bonding the formed non-woven electret fibrous web, optionally wherein the bonded non-woven electret fibrous web has a Basis Weight of 40 to 250 gsm.

14. The process according to claim 13, wherein forming the non-woven electret fibrous web by carding and cross-lapping further comprises the steps of:
delivering the fibers that are present into a coarse opening apparatus to coarsely open the fibers;
then delivering the coarsely opened fibers to a mixing apparatus to mechanically mix the fibers;
then subjecting the mechanically mixed fibers to a fine opening treatment;
then introducing the treated fibers into a feeding device for feeding the fibers uniformly;
then feeding the treated fibers to a carding machine for forming a substantially uniform non-woven electret fibrous web;
then subjecting the substantially uniform non-woven electret fibrous web to a cross-lapping process; and
then subjecting the cross-lapped non-woven electret fibrous web to a needle punching process.

15. The process according of claim 13, wherein forming the non-woven electret fibrous web by air-laying further comprises the steps of:
delivering the fibers that are present into a coarse opening apparatus to coarsely open the fibers;
then delivering the coarsely opened fibers to a mixing apparatus to mechanically mix the fibers;
then subjecting the mechanically mixed fibers to a fine opening treatment;
then introducing the treated fibers into a feeding device for feeding the treated fibers uniformly;
then feeding the treated fibers to an air-laying machine to form a substantially uniform non-woven electret fibrous web; and
then subjecting the substantially uniform non-woven electret fibrous web to a needle punching process.

16. The process according to claim 13, comprising the steps of:
delivering the fibers that are present into a coarse opening apparatus to coarsely open the fibers;
then delivering the coarsely opened fibers to a mixing apparatus to mechanically mix the fibers;
then subjecting the mechanically mixed fibers to a fine opening treatment;
then introducing the treated fibers into a feeding device for feeding the treated fibers substantially uniformly;
then feeding the treated fibers to a carding machine to produce a substantially uniform non-woven electret fibrous web;
then subjecting the substantially uniform non-woven electret fibrous web to a cross-lapping process; and
then subjecting the cross-lapped non-woven electret fibrous web to a through-air bonding process.

17. The process according to claim 13, comprising the steps of:
delivering the fibers that are present into a coarse opening apparatus to coarsely open the fibers;
then delivering the coarsely opened fibers to a mixing apparatus to mechanically mix the fibers;
then subjecting the mechanically mixed fibers to a fine opening treatment;
then introducing the treated fibers into a feeding device for feeding the treated fibers substantially uniformly;
then feeding the treated fibers to an air-laying machine for forming a substantially uniform non-woven electret fibrous web; and
then subjecting the substantially uniform non-woven electret fibrous web to through-air bonding.

18. The process according to claim 13, wherein opening is achieved with an opening roller, wherein the opening roller has a rotational frequency of 30-50 revolutions per second.

19. The process according to claim 13, wherein the bonding comprises a needle punching process in which the needling frequency is 100-1000 times/minute, or through-air bonding in which the hot air temperature is 130-150° C.

20. The process according to claim 13, wherein the bonded non-woven electret fibrous web is subjected to at least one of a calendaring step or a pleating step.

* * * * *